(12) United States Patent
Matsuo et al.

(10) Patent No.: US 10,616,891 B2
(45) Date of Patent: Apr. 7, 2020

(54) WIRELESS COMMUNICATION DEVICE AND WIRELESS COMMUNICATION METHOD

(71) Applicant: KABUSHIKI KAISHA TOSHIBA, Minato-ku, Tokyo (JP)

(72) Inventors: Ryoko Matsuo, Tokyo (JP); Tomoko Adachi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/392,391

(22) Filed: Dec. 28, 2016

(65) Prior Publication Data

US 2017/0196010 A1 Jul. 6, 2017

(30) Foreign Application Priority Data

Jan. 6, 2016 (JP) ................. 2016-001295

(51) Int. Cl.
*H04W 72/04* (2009.01)
*H04W 74/08* (2009.01)
(Continued)

(52) U.S. Cl.
CPC ..... *H04W 72/0453* (2013.01); *H04W 72/085* (2013.01); *H04W 74/0816* (2013.01); *H04W 84/12* (2013.01)

(58) Field of Classification Search
CPC ........... H04W 72/0453; H04W 72/085; H04W 74/0816; H04W 84/12
See application file for complete search history.

(56) References Cited

U.S. PATENT DOCUMENTS 8,290,503 B2 10/2012 Sadek et al.
8,363,578 B1 1/2013 Ramamurthy et al.
(Continued)

FOREIGN PATENT DOCUMENTS

CN 103828457 A 5/2014
EP 2 589 191 A1 5/2013
(Continued)

OTHER PUBLICATIONS

U.S. Appl. No. 15/202,960, filed Jul. 6, 2016, Kabushiki Kaisha Toshiba.
(Continued)

*Primary Examiner* — Habte Mered
(74) *Attorney, Agent, or Firm* — Foley & Lardner LLP

(57) ABSTRACT

According to one embodiment, a wireless communication device, includes: a transmitter configured to transmit a first frame that contains first information specifying a plurality of frequency components and does not include second information specifying other wireless communication devices to which the plurality of frequency components are allocated; a receiver configured to receive at least one second frame to be transmitted via at least one of the plurality of frequency components; and allocate a first frequency component selected from among the plurality of frequency components based on third information to a transmitting device of the second frame out of the other wireless communication devices, wherein the receiver is configured to receive the third information through the second frame or a third frame transmitted before the second frame is transmitted.

13 Claims, 20 Drawing Sheets

(51) Int. Cl.
*H04W 72/08* (2009.01)
*H04W 84/12* (2009.01)

(56) References Cited

U.S. PATENT DOCUMENTS

| | | | |
|---|---|---|---|
| 9,100,984 | B2 | 8/2015 | Kim et al. |
| 9,281,928 | B2 | 3/2016 | Porat et al. |
| 9,641,234 | B2 | 5/2017 | Moon et al. |
| 9,800,501 | B2 | 10/2017 | Merlin |
| 2006/0187942 | A1 | 8/2006 | Mizutani et al. |
| 2006/0203837 | A1 | 9/2006 | Shvodian |
| 2009/0323602 | A1 | 12/2009 | Li et al. |
| 2012/0009888 | A1 | 1/2012 | Smadi |
| 2012/0218983 | A1 | 8/2012 | Noh et al. |
| 2012/0275405 | A1 | 11/2012 | Kim et al. |
| 2013/0064119 | A1 | 3/2013 | Montojo et al. |
| 2013/0265907 | A1 | 10/2013 | Kim et al. |
| 2014/0198642 | A1 | 7/2014 | Barriac et al. |
| 2015/0063111 | A1 | 3/2015 | Merlin et al. |
| 2015/0063258 | A1 | 3/2015 | Merlin et al. |
| 2015/0146654 | A1 | 5/2015 | Chu et al. |
| 2015/0188675 | A1 | 7/2015 | Abeysekera et al. |
| 2015/0201434 | A1 | 7/2015 | Fang et al. |
| 2016/0057736 | A1 | 2/2016 | Jung et al. |
| 2016/0105836 | A1 | 4/2016 | Seok |
| 2016/0128102 | A1* | 5/2016 | Jauh .................. H04W 74/0833 370/329 |
| 2016/0165589 | A1 | 6/2016 | Chu et al. |
| 2016/0183305 | A1 | 6/2016 | Huang et al. |
| 2016/0227579 | A1 | 8/2016 | Stacey et al. |
| 2016/0242070 | A1 | 8/2016 | Asterjadhi et al. |
| 2016/0278081 | A1 | 9/2016 | Chun |
| 2016/0330722 | A1 | 11/2016 | Pantelidou et al. |
| 2016/0353434 | A1* | 12/2016 | Ghosh ............... H04W 72/0446 |
| 2016/0360507 | A1* | 12/2016 | Cariou ................. H04W 72/04 |
| 2017/0026151 | A1 | 1/2017 | Adachi |
| 2017/0048882 | A1* | 2/2017 | Li .......................... H04L 5/0037 |
| 2017/0079071 | A1* | 3/2017 | Zhou ................. H04W 74/0833 |
| 2017/0127428 | A1 | 5/2017 | Adachi et al. |
| 2017/0127453 | A1 | 5/2017 | Adachi et al. |
| 2017/0171723 | A1 | 6/2017 | Adachi |
| 2017/0180088 | A1 | 6/2017 | Adachi et al. |
| 2017/0181039 | A1 | 6/2017 | Adachi et al. |
| 2017/0188362 | A1* | 6/2017 | Cariou ..................... H04J 11/00 |
| 2017/0196010 | A1 | 7/2017 | Matsuo |
| 2017/0366321 | A1* | 12/2017 | Kim ...................... H04L 1/1671 |
| 2018/0007561 | A1 | 1/2018 | Adachi et al. |
| 2018/0007701 | A1 | 1/2018 | Adachi et al. |
| 2018/0035488 | A1* | 2/2018 | Yang .................. H04W 74/004 |
| 2018/0048573 | A1 | 2/2018 | Merlin et al. |
| 2018/0077735 | A1* | 3/2018 | Ahn ..................... H04W 28/26 |
| 2018/0084605 | A1 | 3/2018 | Li et al. |
| 2019/0230629 | A1 | 7/2019 | Chu et al. |

FOREIGN PATENT DOCUMENTS

| | | |
|---|---|---|
| EP | 3 294 036 A1 | 3/2018 |
| JP | 2005-223937 A | 8/2005 |
| JP | 2012-517147 A | 7/2012 |
| JP | 2013-219687 A | 10/2013 |
| JP | 2015-515826 A | 5/2015 |
| JP | 2017-085508 A | 5/2017 |
| WO | WO-2006/000955 A1 | 1/2006 |
| WO | WO-2012/002855 A1 | 1/2012 |
| WO | WO-2014/014084 A1 | 1/2014 |
| WO | WO-2015/031431 A1 | 3/2015 |
| WO | WO-2015/068968 A1 | 5/2015 |
| WO | WO-2016/032007 A1 | 3/2016 |
| WO | WO-2016/126370 A1 | 8/2016 |

OTHER PUBLICATIONS

U.S. Appl. No. 15/267,863, filed Sep. 16, 2016, Kabushiki Kaisha Toshiba.

Stéphane Baron et al.: "RU selection process upon TF-R reception; 11-15-1047-00-00ax-ru-selection-process-upon-tf-r-reception", Canon, IEEE Draft; 11-15-1047-00-00AX-RU-Selection-Process-Upon-TF-R-Reception, IEEE-SA Mentor, Piscataway, NJ USA, vol. 802. 11ax, Sep. 14, 2015, pp. 1-9, XP068098236, {retrieved on Sep. 14, 2015}.

Adachi, Tomoko: "Reception Status of Frames Transmitted in Random Access RUs", IEEE 802.11-15/1341r2, Toshiba, Nov. 2015, pp. 1-10.

Ghosh et al., "Random Access with Trigger Frames using OFDMA", IEEE 802.11-15/0875r1, Intel, Jul. 2015, pp. 1-16.

Adachi et al.: U.S. Office Action on U.S. Appl. No. 15/267,863 dated Jan. 26, 2018.

Adachi et al.: U.S. Office Action on U.S. Appl. No. 15/267,885 dated Apr. 2, 2018.

Stacey, Robert: "Specification Framework for TGax", IEEE 11-15-0132-13-00ax-spec-framework, Intel, Dec. 2015, pp. 1-38.

U.S. Appl. No. 15/267,885, filed Sep. 16, 2016, Adachi et al.

Adachi, Tomoko: "Reception Status of Frames Transmitted in Random Access RUs", IEEE 802.11-15/1341r1, Toshiba, Nov. 2015, pp. 1-10.

Ghosh, Chittabrata et al.: "UL OFDMA-based Random Access Procedure", IEEE 802.11-15/1105r0, Intel, Sep. 2015, pp. 1-19.

Ghosh, Chittabrata et al.: "Power Save with Random Access", IEEE 802.11-15/1107r0, Intel, Sep. 2015, pp. 1-21.

Stacey, Robert: "Specification Framework for TGax", IEEE 802. 11-15/0132r13, Intel, Dec. 2015, pp. 1-38.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

U.S. Appl. No. 15/445,702, filed Feb. 28, 2017, Adachi et al.

Azizi et al.: "OFDMA Numerology and Structure", IEEE 802.11-15/0330r5, Intel and LGE, May 2015, pp. 1-50.

Notice of Allowance dated Dec. 12, 2018 issued in co-pending U.S. Appl. No. 15/267,863.

Notice of Allowance dated Jan. 23, 2019 issued in co-pending U.S. Appl. No. 15/445,702.

Park, Minyoung: "Specification Framework for TGan", IEEE 802. 11-11/1137r15, Intel, May 2013, pp. 1-77.

Rizzoli et al., "Computer-aided noise analysis of integrated microwave front-ends," IEEE MTT-S Digest, 1995, pp. 1561-1564.

Stacey, Robert: "Specification Framework for TGax", IEEE 802. 11-15/0132r5, Intel, May 2015, pp. 1-7.

Notice of Allowance dated Feb. 6, 2019 issued in co-pending U.S. Appl. No. 15/267,863.

U.S. Appl. No. 15/445,528, filed Feb. 28, 2017, Adachi et al.

Stacey, Robert: "Specification Framework for TGax", IEEE 11-15-0132-02-00ax-spec-framework, Intel, Jan. 2015, pp. 1-3.

Translation of International Preliminary Report on Patentability dated Jun. 15, 2017 received in corresponding International Application No. PCT/JP2015/083660.

Adachi, Tomoko et al.: "Reception Status of Frames Transmitted in Random Access RUs", IEEE 802.11-15/1341-02-00 (1341r2), Toshiba, Nov. 2015, pp. 1-10.

IEEE Std 802.11n-2009, Oct. 29, 2009, pp. 56,76-79, URL: https://ieeexplore.ieee.org/servlet/opac?punumber=5307291.

Stacey, Robert: "Specification Framework for TGax", IEEE 11-15-0132-09-00ax-spec-framework, Intel, Sep. 2015, pp. 1-22.

Stacey, Robert: "Specification Framework for TGax," IEEE 11-15-0132-17-00ax-spec-framework, Intel, May 2016, pp. 1-61.

Stacey, Robert: "Specification Framework for TGax", IEEE 11-15-0132-08-00ax-spec-framework, Intel, Sep. 2015, pp. 1-22.

U.S. Appl. No. 62/112,894, filed Feb. 6, 2015, Chu et al.

U.S. Final Office Action dated Aug. 28, 2018 issued in co-pending U.S. Appl. No. 15/267,885.

(56) References Cited

OTHER PUBLICATIONS

IEEE Std 802.11ac-2013, Dec. 11, 2013, pp. 71, 91, 98-99, 186-187, URL, https://ieeexplore.ieee.org/servlet/opac?punumber=6687185.
U.S. Non-Final Office Action dated Jul. 27, 2018 issued in co-pending U.S. Appl. No. 15/202,960.
U.S. Non-Final Office Action dated Jul. 23, 2018 issued in co-pending U.S. Appl. No. 15/445,528.
U.S. Non-Final Office Action dated Aug. 14, 2018 issued in co-pending U.S. Appl. No. 15/445,702.
U.S. Non-Final Office Action dated Jul. 3, 2018 issued in co-pending U.S. Appl. No. 15/267,863.
U.S. Final Office Action dated Mar. 7, 2019 issued in co-pending U.S. Appl. No. 15/202,960 (including U.S. Pat. No. 10,128,925 B2, US 2018/0054240 A1, US 2016/0227533 A1, US 2018/0014316 A1, US 2017/0289933 A1, and US 2016/0374070 A1).
Notice of Allowance dated Mar. 18, 2019 issued in co-pending U.S. Appl. No. 15/267,885 (including US 2014/0198642 A1, US 2016/0360507 A1, US 2017/0366321 A1, US 2018/0035488 A1, and US 2018/0084605 A1).
U.S. Final Office Action dated Feb. 21, 2019 issued in co-pending U.S. Appl. No. 15/445,528 (including US 2015/0172012 A1, US 2015/0146653 A1, US 2016/0044533, and US 2013/0265907).
Notice of Allowance dated May 1, 2019 issued in co-pending U.S. Appl. No. 15/445,702.
Corrected Notice of Allowability dated Jul. 2, 2019 issued in co-pending U.S. Appl. No. 15/267,863.
U.S. Non-Final Office Action dated Aug. 30, 2019 issued in co-pending U.S. Appl. No. 15/445,528.
U.S. Non-Final Office Action dated Sep. 6, 2019 issued in co-pending U.S. Appl. No. 15/202,960.
Adachi et al., "Regarding trigger frame in UL MU", IEEE 082.11-15/0608r1, IEEE, Internet<URL:https://mentor.ieee.org/082.11/dcn/15/11-15-0608-01-00ax-regarding-trigger-frame-in-ul-mu.pptx>, Apr. 2015.
Girici et al., "Proportional Fair Scheduling Alforithm in OFDMA-Based Wireless Systems with QoS constraints", Journal of Communications and Networks, vol. 12, No. 1, Feb. 2010, pp. 30-42.
Ghosh et al., "Random Access with Trigger Frames using OFDMA", IEEE 802.11-15/0604r0, IEEE, Internet<URL:https//mentor.ieee.org/802.11/dcn/15/11-15-0604-00-00ax-random-access-with-trigger0frames-using-ofdma.pptx>, May 2015.

\* cited by examiner

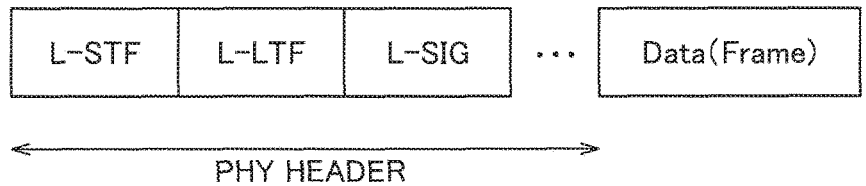
FIG. 7
FIG. 8
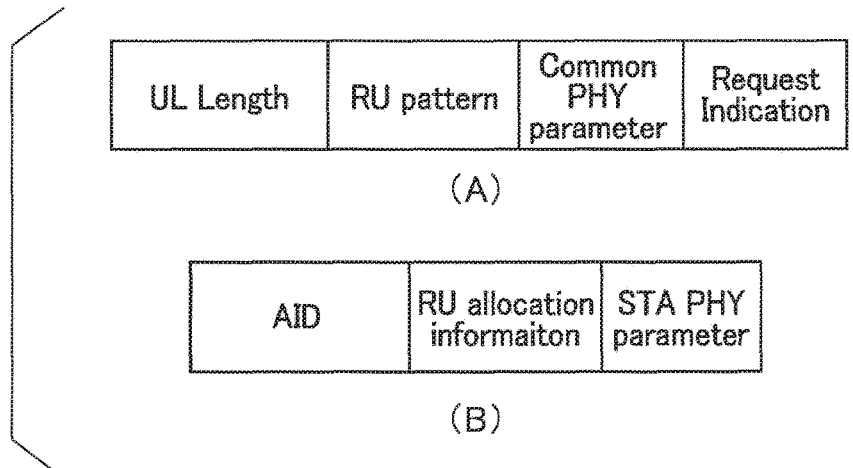
FIG. 9
FIG. 10

| L-STF | L-LTF | L-SIG | SIG1 | SIG2 | Data(521) |
|---|---|---|---|---|---|
| | | | | SIG2 | Data(522) |
| | | | | ... | |
| | | | | SIG2 | Data(525) |

FIG. 14

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2016-001295, filed on Jan. 6, 2016, the entire contents of which are incorporated herein by reference.

FIELD

Embodiments of the present invention relate to a wireless communication device, and a wireless communication method.

BACKGROUND

Multi-user communication (multiplex communication) between a base station (hereinafter, which may be referred to as an access point) and a plurality wireless communication terminals (hereinafter, which may be referred to as terminals or terminals) is discussed. Uplink multi-user communication is represented as UL-MU (UpLink Multi-User) communication, and downlink multi-user communication is represented as DL-MU (DownLink Multi-User) communication.

As the multi-user communication, frequency multiplexing communication is known according to which different frequency components for each terminal are used as communication resources and transmissions to a plurality of terminals and receptions from a plurality of terminals are simultaneously performed. Here, Orthogonal Frequency Division Multiple Access (OFDMA) scheme is considered where the frequency components are defined as resource units each including one or a plurality of subcarriers, and the resource units each are used as a smallest unit of the communication resource, and transmissions to the plurality of terminals or receptions from the plurality of terminals are simultaneously performed. The simultaneous transmissions from the access point to the plurality of terminals correspond to downlink OFDMA (DL-OFDMA) transmission and the simultaneous transmissions from the plurality of terminals to the access point correspond to uplink OFDMA (UL-OFDMA) transmission. The DL-OFDMA is an example of the DL-MU, and The UL-OFDMA is an example of the UL-MU.

In a case of the UL-OFDMA, it may be considered that in order to match timings of uplink transmission, a trigger frame specifying terminals that are to be subjected to the UL-OFDMA and resource units allocated to the terminals is transmitted from an access point. This method has problems that in a case such as where the specified terminal is transited to a sleep mode, or the specified terminal has no uplink transmission request, the resource unit allocated to the specified terminal is not efficiently used and a usage efficiency of a communication resource is decreased.

There is another method in which the trigger frame does not specify any terminal, but specifies only resource units that are to be used. A terminal having received a trigger frame randomly selects a resource unit from among resource units without terminal specification (sometimes referred to as "STA-unspecified RU"), and transmits a frame serving as a response frame. Such a trigger frame containing specification of STA-unspecified RU is sometimes referred to as a trigger frame for random access (TF-R). In some cases, there is a TF-R in which only some resource units are STA-unspecified RUs, and the other resource units have terminal specification.

Methods of causing a terminal having received TF-R randomly to select a resource unit from among STA-unspecified RUs include the following method. A random number (backoff value) selected from a contention window (CW) for random access is decremented by a value according to the number of STA-unspecified RUs every time of receiving TF-R. The backoff value is managed on a terminal-by-terminal basis. When a STA-unspecified RU having a determined backoff value equal to or less than zero occurs, the terminal obtains an access right, randomly selects a resource unit from among the STA-unspecified RUs specified by TF-R, and transmits a response frame in the selected resource unit predetermined time (xIFS) after completion of receiving TF-R. Such random selection of the resource unit can increase the possibility of avoiding frame collision at an access point at in a case of access between multiple terminals. Note that a CW for random access is different from a contention window used to determine the backoff time at the time of CSMA/CA carrier sense.

TF-R can be used to collect an UL-MU allocation request from a terminal (uplink transmission request). The access point receives response frames containing uplink transmission requests from multiple terminals in response to the transmitted TF-R (UL-OFDMA based on TF-R). The access point allocates, to the terminal, the same resource unit as the resource unit in which the response frame has been transmitted. The resource units to be allocated to the multiple terminals are determined through one or more times of TF-R transmission, and subsequently, a trigger frame that specifies the multiple terminals and resource units allocated to the terminals is transmitted. The terminals that have received the trigger frame and been designated by the trigger frame transmit a data frame containing data for uplink transmission using the specified resource unit the predetermined time (xIFS) after the trigger frame (UL-OFDMA based on the trigger frame), respectively.

The communication qualities of the terminals on a resource unit basis typically vary; however, this feature depends on the bandwidth of the resource unit and the channel to which the resource unit belongs. The communication quality may be, for example, SNR (Signal to Noise Ratio), RSSI (Received Signal Strength Indicator), reception EVM (Error Vector Magnitude) or the like. According to the communication quality, MCS (Modulation and Coding Scheme) usable by the terminals varies. To improve the UL-OFDMA efficiency based on the trigger frame, it is preferred to allocate resource units with communication qualities so as to allow a high MCS to be applied to the terminals. However, allocating resource units randomly selected by the terminals to the terminals cannot achieve appropriate resource unit allocation, which causes a possibility of reducing UL-OFDMA efficiency.

BRIEF DESCRIPTION OF THE DRAWINGS

FIG. 7 is a diagram for illustrating a schematic configuration of a physical header;

FIG. 8 is a diagram showing an example of a format of a trigger frame according to the first embodiment;

FIG. 9 is a diagram showing an example of a detailed format of a part of field of the trigger frame;

FIG. 10 is a diagram showing another example of the format of the trigger frame according to the first embodiment;

FIG. 14 is a diagram showing a schematic format example of a physical packet used in DL-OFDMA transmission;

DETAILED DESCRIPTION

According to one embodiment, a wireless communication device, includes: a transmitter configured to transmit a first frame that contains first information specifying a plurality of frequency components and does not include second information specifying other wireless communication devices to which the plurality of frequency components are allocated; a receiver configured to receive at least one second frame to be transmitted via at least one of the plurality of frequency components; and controlling circuitry configured to allocate a first frequency component selected from among the plurality of frequency components based on third information to a transmitting device of the second frame out of the other wireless communication devices, wherein the receiver is configured to receive the third information through the second frame or a third frame transmitted before the second frame is transmitted.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

(First Embodiment)

Figure 1:
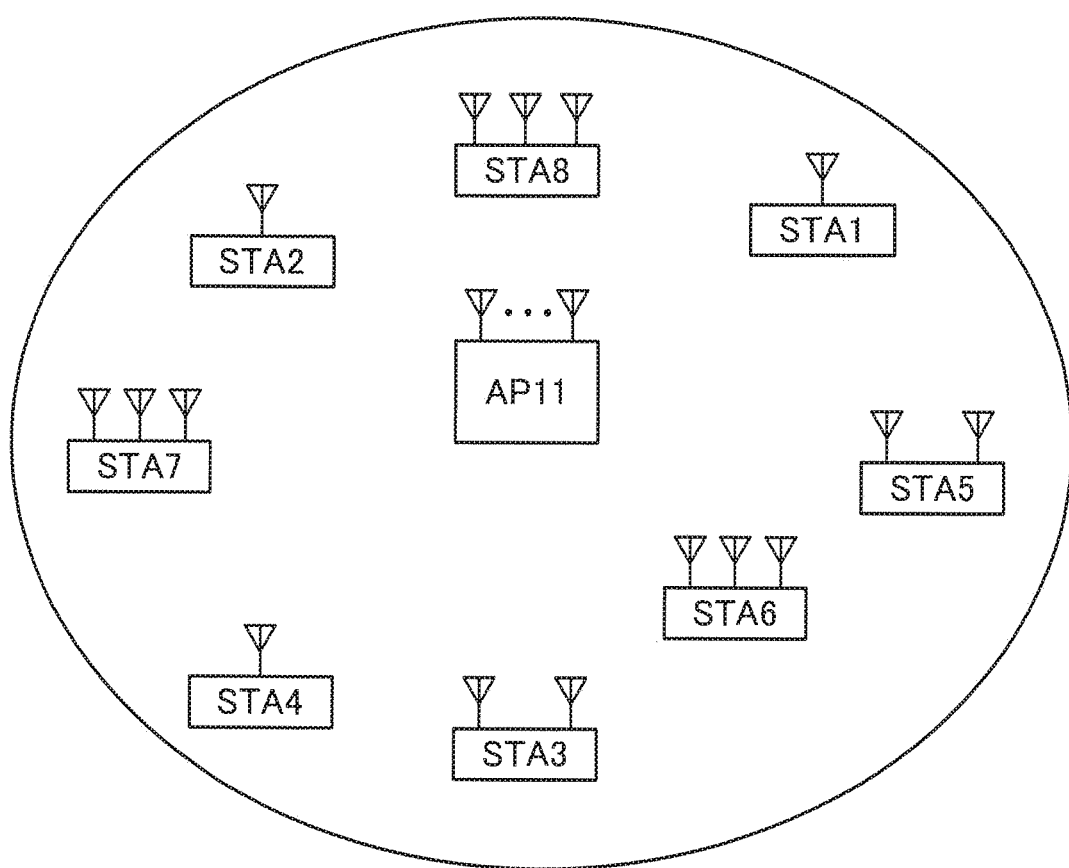
FIG. 1 is a diagram showing a wireless communication system according to a first embodiment.

FIG. 1 is a configuration diagram of a wireless communication system which includes an access point (AP) serving as a base station, and a wireless communication terminal (hereinafter which may be referred to as a station) according to a first embodiment. This wireless communication system conforms to IEEE 802.11 standard. Alternatively, this system may conform to another communication scheme. The access point has a function basically analogous to a terminal except in that the access point has a relay function. It can thus be regarded that the access point is a mode of a terminal. The access point and the terminal each include a wireless communication device that communicates in conformity with IEEE 802.11 standard. A terminal-mounted wireless communication device communicates with an access-point-mounted wireless communication device. The access-point-mounted wireless communication device communicates with the terminal-mounted wireless communication device.

Terminals (STA: Station) 1 to 8 access the access point (AP) 11 to form one wireless communication system or a wireless communication group (BSS: Basic Service Set). The connection means a state in which a wireless link is established. The terminals 1 to 8 are subjected to an association process with the access point, and then exchange of parameters required for communication is completed, which establishes the wireless link. The terminals 1 to 8 belong to the BSS of the access point 11.

The access point 11 includes at least one antenna. Here, the access point 11 includes multiple antennas. The wireless communication device in the access point 11 transmits and receives a MAC frame (hereinafter, sometimes referred to as a frame) to and from multiple terminals via one or more antennas. More specifically, the device transmits and receives a physical packet in which a physical header is added to the frame. The wireless communication device of the access point 11 includes a wireless communicator which is connected to the antenna and transmits and receives frames, and a controller which controls communication with the terminal. The wireless communicator is formed of a RF (Radio Frequency) integrated circuit, for example. The controller is formed of a baseband integrated circuit, for example. However, the configuration is not limited to this example.

The terminals 1 to 8 each include one or more antennas. Each terminal is mounted with a wireless communication device. The wireless communication device in each terminal transmits and receives a frame (more specifically, a physical packet that includes a frame and a physical header added to the frame) to and from the access point via the antennas. The wireless communication device of each terminal includes a wireless communicator which is connected to the antenna and transmits and receives frames, and a controller which controls communication with the access point 11. The wireless communicator is formed of a RF (Radio Frequency) integrated circuit, for example. The controller is formed of a baseband integrated circuit, for example. However, the configuration is not limited to this example.

The access point 11 forms BSS or a wireless network (referred to as a first network) with each of the terminals. Beside this configuration, the access point 11 may be connected to another network (referred to as a second network) which is a wired or wireless or a wired and wireless hybrid network via another interface. The access point 11 may relay communication between the first network and the second network. The access point 11 may relay communication between terminals in the first network. Frames, such as data frames generated by the terminals 1 to 8, are transmitted to the access point 11. The access point 11 transfers the data frames to another terminal in the first network or to the second network according to their receiving STA addresses. The frame described in this specification is not limited to what is called a frame in IEEE 802.11 standard, for example, and may be what is called a packet, instead.

This embodiment allows OFDMA (Orthogonal Frequency Division Multiple Access) communication between the access point 11 and the terminals 1 to 8 or some of these terminals. The OFDMA allocates resource units which each include one or more subcarriers and may also be referred to as a subchannel, resource block, frequency block or the like, as communication resources, to the terminals, and communication is simultaneously made with the terminals on a resource unit basis. Uplink OFDMA is described as UL-OFDMA while downlink OFDMA is described as DL-OFDM.

Figure 2:
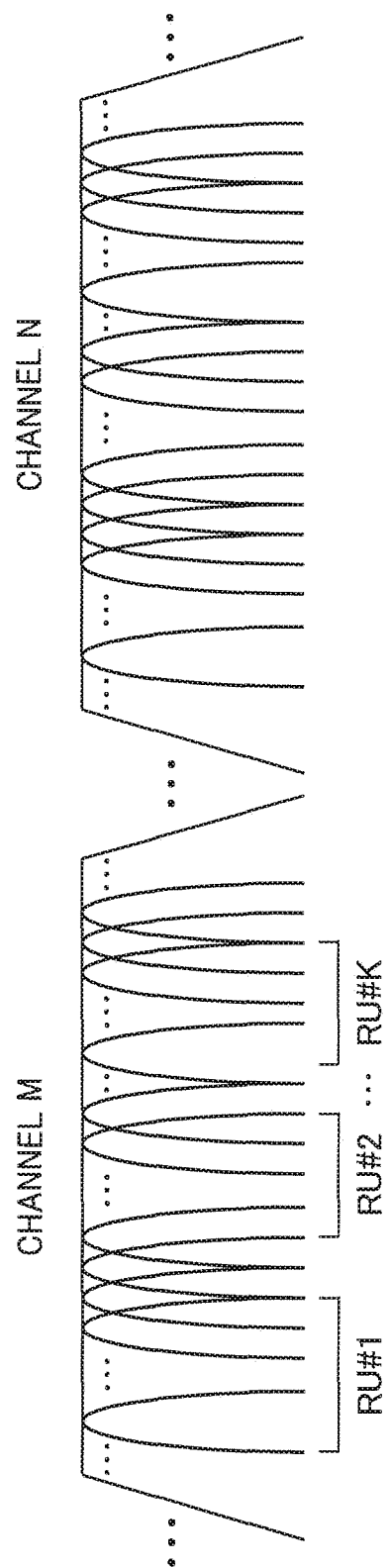
FIG. 2 is a diagram for illustrating resource unit allocation.

The resource unit is a smallest unit of a resource for performing communication. FIG. 2 illustrates the resource units (RU#1, RU#2 . . . RU#K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication is realized by different resource units being simultaneously used by different terminals.

Figure 3:
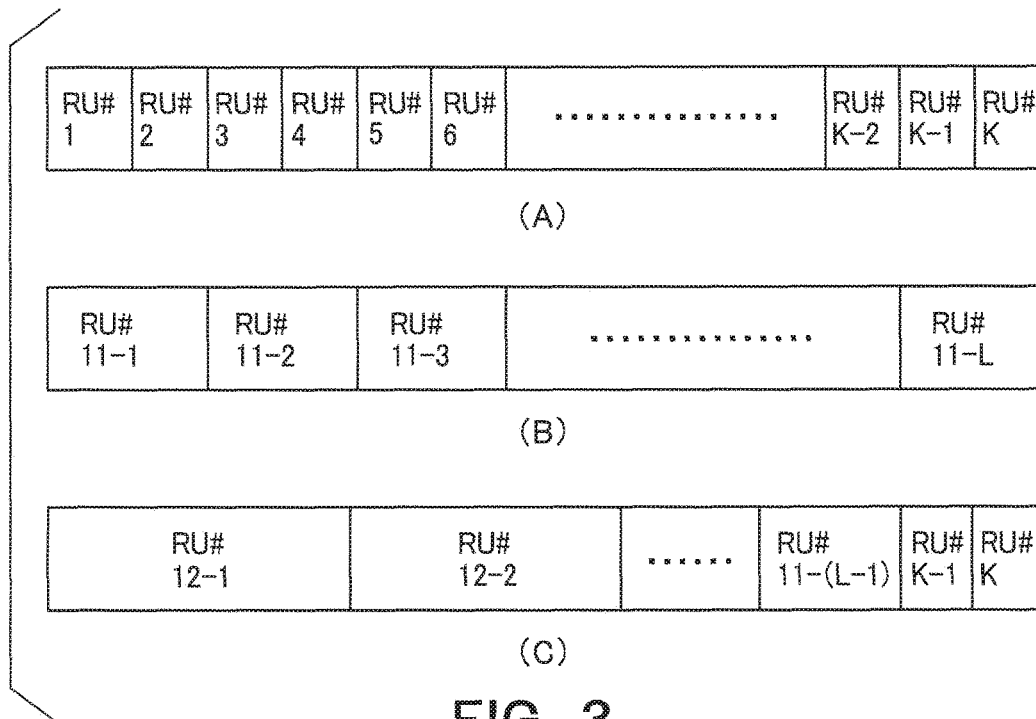
FIG. 3 is a diagram for illustrating resource unit allocation.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 3. The width direction on the paper surface corresponds to the frequency domain direction. A pattern identifier may be assigned to the arrangement pattern and the access point may select any arrangement pattern based on the pattern identifier. The arrangement pattern shown here is one example and other various arrangement patterns are possible.

FIG. 3(A) illustrates an example where a plurality of resource units (RU#1, RU#2 . . . RU#K) having the same bandwidth are arranged, and FIG. 3(B) illustrates another example where a plurality of resource units (RU#11-1, RU#11-2 . . . RU#11-L) having a larger bandwidth than that of FIG. 3(A) are arranged. FIG. 3(C) illustrates a still another example where resource units with three types of bandwidths are arranged. The resource units (RU#12-1, RU#12-2) have the largest bandwidth, the resource unit RU#11-(L−1) has the bandwidth identical to that of FIG. 3(B), and the resource units (RU#K-1, RU#K) have the bandwidth identical to that of FIG. 3(A).

Here, the number of resource units used by each terminal is not limited to a particular value and one or a plurality of resource units may be used. When a terminal uses a plurality of resource units, a plurality of resource units that are continuous in terms of frequency may be used, or a plurality of resource units that are located at positions away from each other may be allowed to be used. The resource unit #11-1 of FIG. 3(B) may be regarded as one example of a resource unit bonding the resource units #1 and #2 of FIG. 3(A).

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

It is assumed here that a terminal that implements OFDMA is successful in carrying out reception and decoding (including demodulation, decoding of error correcting code, etc.) of a physical packet including a frame on a channel of at least the basic channel width (20 MHz channel width if an IEEE 802.11a/b/g/n/ac standard-compliant terminal is regarded as a legacy terminal) at the legacy terminal that is to be backward compatible. With regard to the carrier sense, it is carried out in a unit of the basic channel width. The carrier sense may encompass both physical carrier sense associated with busy/idle of CCA (Clear Channel Assessment) and Virtual Carrier Sense based on medium reservation time indicated in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as being in the idle state by the carrier sense information are all in the idle state.

With regard to OFDMA, channel-based OFDMA is also applicable in addition to the above-described resource-unit-based OFDMA. OFDMA of this case may in particular be called MU-MC (Multi-User Multi-Channel). In MU-MC, an access point assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals. The OFDMA which will be described below means the resource-unit-based OFDMA: however, an embodiment of channel-based OFDMA can also be implemented with appropriate replacement of terms and phrases in the following explanations such as reading the "resource unit" as the "channel".

Figure 4:
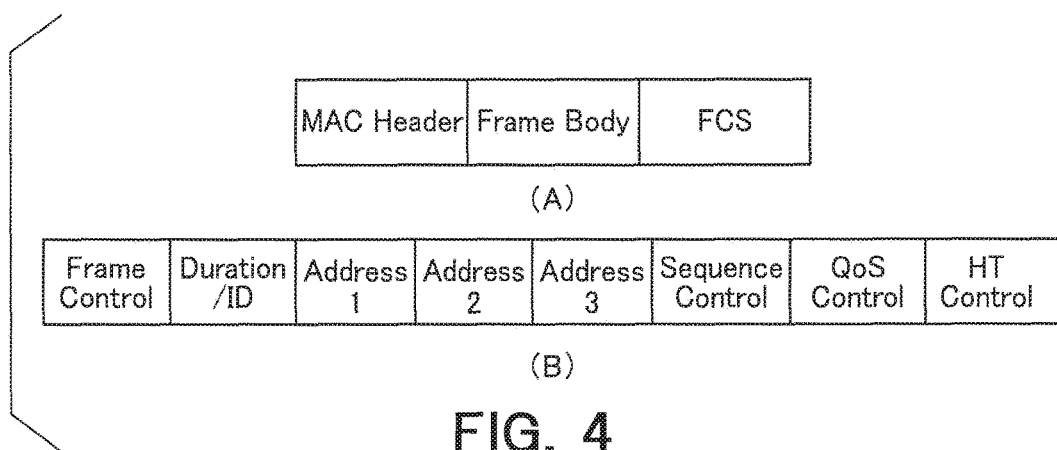
FIG. 4 is a diagram showing an example of a basic format of an MAC frame.

FIG. 4(A) illustrates the basic exemplary format of the MAC frame. The data frame, the management frame, and the control frame in accordance with this embodiment are based on a frame format as shown in FIG. 4(A) (each type of a frame is described later). This frame format includes the fields of MAC header, Frame body, and FCS. The MAC header includes, as illustrated in FIG. 4(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 4 may exist. For example, an Address 4 field may further exist. Also, an RU/AID field which will be described later may exist in the MAC header or the frame body field.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

As described above, two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a BA frame or a BAR frame within the control frame, or a beacon frame within the management frame is made by the Subtype field. The trigger frame which will be described later may also be discriminated by the combination of the Type and the Subtype. It is likely that the trigger frame is categorized as the control frame.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector).

The QoS field is used to carry out QoS control to carry out transmission with the priorities of the frames taken into account. The QoS control field includes a TID field (16 types from 0 to 15) in which an identifier is set for data traffic, and an Ack policy field in which an acknowledgement scheme is set. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT control filed is a filed introduced in IEEE 802.11n. The HT (High Throughput) control field is present when the Order field is set to 1 for QoS data frame or a management frame. The HT control field can be extended to a VHT (Very High Throughput) control field in IEEE 802.11ac and an HE (High Efficient) control field in IEEE 802.11ax which is a next-generation wireless LAN standard and can provide notifications corresponding to the functions of 802.11n, 802.11ac, or 802.11ax.

Figure 5:
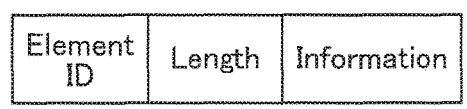
FIG. 5 is a diagram showing an example of a format of an information element.

In the management frame, an information element (Information element; IE) to which a unique Element ID (IDentifier) is assigned is set in the Frame Body field. One or a plurality of information elements may be set in the frame body field. The information element has, as illustrated in FIG. 5, the fields of an Element ID field, a Length field, and an Information field. The information element is discriminated by the Element ID. The Information field is adapted to store the content of the information to be notified, and the Length field is adapted to store the length information of the information field. In the management frame, predefined one or more fields may be arranged depending on the frame type (Subtype) other than the information element.

Frame check sequence (FCS) information is set in the FCS field as a checksum code for use in error detection of the frame on the reception side. As an example of the FCS information, CRC (Cyclic Redundancy Code) may be mentioned.

Figure 6:
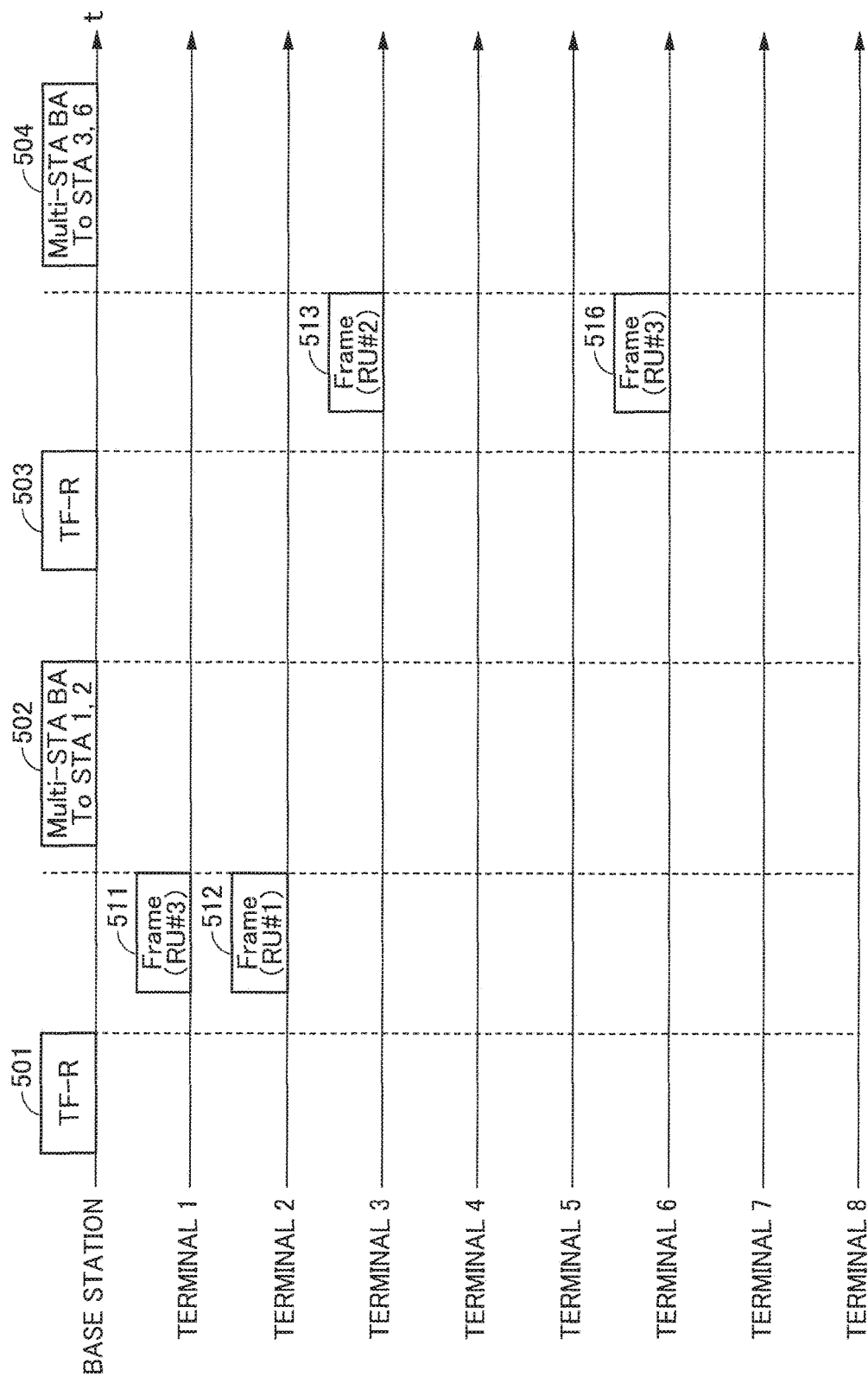
FIG. 6 is a diagram showing an example of an operation sequence according to the first embodiment.

FIG. 6 shows an exemplary operational sequence of a base station (AP) 101 and plural terminals including a terminal (STA) 1 to a terminal (STA) 8 according to the embodiment. Each of the terminals 1 to 8 is an OFDMA-compliant terminal.

In this exemplary operation sequence, as its premise, CSMA/CA-based communications are individually carried out (single user communications) between the access point and all or part of the terminals 1 to 8. In the single user communications, communications are carried out between the access point and the terminals (transmission from each terminal to the access point and transmission from the access point to each terminal), for example, on one channel with the basic channel width (for example, 20 MHz). As one example of the single user communications, when data for uplink transmission is held by the terminal, the right to access the wireless medium is acquired in accordance with CSMA/CA. As a result, the terminal carries out carrier sense for the carrier sense time (standby time) during the DIFS/AIFS[AC] and a randomly defined back-off time, and when it has been determined that the medium (CCA) is in the idle state, the terminal acquires the right to access to transmit, for example, one frame. The terminal transmits the data frame (more specifically, a physical packet including the data frame). When the access point has received this data frame successfully, then the access point returns an ACK frame (more specifically, a physical packet including the ACK frame) which is a delivery confirmation response (acknowledgement) frame after the elapse of SIFS time after completion of reception of the data frame. The terminal upon reception of the ACK frame determines that the transmission of the data frame has been successful. It is considered here that the data frame to be transmitted to the access point may be an aggregation frame (A-MPDU, etc.), and the delivery confirmation response frame by which the access point responds may be a BA frame (this also applies to the following explanations). It is considered here that the DIFS/AIFS [AC] time refers to either the DIFS time or the AIFS [AC] time. When the terminal is not QoS-compliant, the DIFS/AIFS [AC] time refers to the DIFS time. When the terminal is QoS-compliant, the DIFS/AIFS [AC] time refers to the AIFS [AC] time which is defined in accordance with the access category (AC) (to be later described) of the data to be transmitted. Note that the physical packet has a basic structure in which the physical header is added to the MAC frame stored in a data field as shown in FIG. 7 described later.

The access point decides to start UL-OFDMA at any timing. This example contemplates a case where UL-OFDMA transmission is performed by the same channel as that of the single user communication (one channel with the basic channel width of 20 MHz). In other words, it is considered in this example that the UL-OFDMA transmission is performed using a plurality of resource units defined within the channel with the basic channel width of 20 MHz. Nevertheless, it is also possible to use other channel widths such as 40 MHz, 80 MHz, etc. to perform the UL-OFDMA transmission.

The access point, when deciding to start the UL-OFDMA, transmits the trigger frame for UL-OFDMA, more specifically, the trigger frame for random access (further specifically, the physical packet including the trigger frame for random access) 501. The trigger frame for random access is described as TF-R below.

TF-R 501 specifies all or at least some of the resource units as resource units which are freely usable by any terminal for responding to TF-R 501. Such resource units (RUs) may sometimes be referred to as "STA-unspecified RUs". All resource units specified by TF-R may be STA-unspecified RUs. Alternatively, some resource units may be STA-unspecified RUs while some other resource units may be resource units allocated to specific terminals. A trigger frame that allocates specific single terminals to all the respective, specified resource units is a normal trigger frame, which is not TF-R. In the following description, representation of a trigger frame or a normal trigger frame means a trigger frame which is not TF-R, unless specifically described.

When the TF-R 501 is transmitted, the access point acquires the access right in advance based on the CSMA/CA. The TF-R 501 is transmitted at a channel having the basic channel width which is the same channel width as that of the single-user communication. The physical packet (which may referred to a physical frame) including the trigger frame for random access has the physical header added to the head of the trigger frame for random access. The physical header includes, as an example, an L-STF (Legacy-Short Training Field), an L-LTF (Legacy-Long Training Field), and an L-SIG (Legacy Signal Field) which are defined by IEEE802.11 standard, as shown in FIG. 8. Each of the L-STF, the L-LTF, and the L-SIG is a field (legacy field) successful in being recognized by a terminal corresponding to a legacy standard such as IEEE802.11a, for example, and information such as information for signal detection, information for frequency correction (channel estimation), and information on transmission rate is stored therein, respectively. Fields other than those described here (e.g., a field that cannot be recognized by a legacy terminal but can be recognized by an OFDMA-compliant terminal) may be included. Note that the TF 501 may be a frame which a legacy terminal can receive and decode as well as an OFDMA-compliant terminal.

FIG. 8 is a diagram showing an exemplary format of the trigger frame (including a case of the TF-R). This has a format of a general MAC frame as a base shown in FIG. 4 and includes the Frame Control field, the Duration/ID field, the Address 1 field, and the Address 2 field, the common information field (Common Info.) field, plural terminal information (STA Information: STA Info) fields and the FCS field. The frame is specified to be the trigger frame by the Type and Subtype fields in the Frame Control field. The Type is "control" as an example, and the Subtype may define a new value corresponding to the trigger frame. However, the trigger frame can be defined with the Type being "management" or "data". Note that, instead of defining a new value as the Subtype, a reserved field of the MAC header can be used as a field notifying that a frame is the trigger frame. The value of the Subtype may be same or different between the trigger frame and the TF-R.

The Address 1 field may be set to a broadcast address or a multicast address as an RA. The Address 2 field may be set to a MAC address of the access point (BSSID) as a TA. However, the Address 1 field or the Address 2 field, or both of them may be omitted in some cases. In a Common Info field, parameter information which is to be commonly notified to multiple terminals is set. FIG. 9(A) shows a format example of the Common Info field. The Common Info field contains, for example, UL Length field, RU pattern field, Common PHY parameter field and Request Indication field.

UL Length field includes transmission time period of a frame to be transmitted by the terminal (e.g., a time period in units of μsec, or a time period in units of 16 μs is set) or information allowing the transmission time period to be calculated (e.g., the number of bytes). In greater detail, in the UL Length field, the UL-OFDMA packet (physical layer convergence procedure (PLCP) protocol data unit; PPDU) length, more specifically, L-SIG Length value contained in Legacy Preamble part of PPDU transmitted in UL-OFDMA is set. This setting allows the ends of frames (packets) transmitted by the terminals to be aligned.

The RU pattern field contains a pattern number exemplified in FIG. 3. Consequently, each terminal can recognize the RU type in which transmission is to be made.

The Common PHY parameter field contains a parameter which is used in the PHY layer to which multiple terminals conform. For example, information indicating the frequency bandwidth (e.g., indicating 20 MHz width or 80 MHz width), and information on the "Guard Interval" of a PHY payload length are contained.

The Request Indication field is a field for indicating an operation which is to be requested from the terminal through transmission of this trigger frame by the access point. For example, a request for transmitting data to the terminal, which may contain specifications of "Type" and "Subtype" of a frame; a request for transmitting a response frame, such as "Ack" or "BlockAck"; a request for reporting the amount of data which has already been accumulated in the terminal and is to be transmitted; information indicating specification that the type of frame to be transmitted may be any type (at the discretion of the terminal) and the like are set. This setting allows the terminal to determine the operation to be performed in a case of receiving the trigger frame (including a case of TF-R). For example, it can be determined whether the data frame is allowed to be transmitted or not. For example, information specifying the format of a terminal information field, information on the number of Per User Info fields may be set instead of the field described above.

In the Per User Info field, parameter information notifying uniquely to the terminal or any terminal (in a case of TF-R) is set. FIG. 9(B) shows a format example of the Per User Info field. The Per User Info field contains, for example, an AID (Association ID), an RU allocation information and an STA PHY parameter field.

In the AID field, an AID allocated to the terminal, or an ID defined for random access (information indicating that use of the resource unit is not limited to a specific terminal) is set. The ID predefined for random access has the value of unused AID (hereinafter represented as "X"). The value of "X" may be "0", for example, however is not limited thereto. The value of "X" may be a value predefined by the system or standard, or a value freely defined by the access point. The value of "X" may be notified from the access point to each terminal through a management frame, such as a beacon frame.

Here, the AID is described. In a case of permitting association to the terminal having transmitted an association request frame, the access point allocates a number generated locally in the network. The number is referred to as AID. For example, a number at least one in a specified range is allocated thereto. The AID is allocated uniquely in the network (BSS). The access point transmits the association response frame containing the AID allocated to the terminal to which association is permitted. The terminal grasps the AID of this terminal itself by reading the AID from the association response frame. The terminal receives, from the access point, the association response frame for association permission, which allows the terminal to belong to the BBS formed by the access point and to communicate with the access point after the receipt. Such a process of association between the access point and the terminal is referred to as an association process. The access point may perform an authentication process before the association process with the terminal.

The RU allocation information field contains information identifying the RU in which the terminal specified in the AID field (may be any random accessing terminal) is permitted for transmission. More specifically, in the RU allocation information field, information identifying one resource unit in a resource unit allocation pattern specified in the RU allocation information field in the RU pattern field of the Common Info field is set. In a case where the ID (=X) for random access is set in the AID field, the resource unit specified in the RU allocation information field is a resource unit to which random access is permitted (a resource unit whose use is not limited to a specific terminal).

The terminal whose own AID is specified in any AID field may perform random access using another resource unit on which AID (=X) for random access is specified. Alternatively, such an operation may be disabled. In this embodiment, such a terminal assumes a mode that does not use the resource unit for random access. However, the configuration is not limited to such a mode.

The STA PHY parameter field contains a parameter used in the terminal specific PHY layer in a case where the terminal transmits. For example, the parameter contains PHY transmission rate information, such as MCS (Modulation and Coding Scheme) index that indicates the transmission rate at which the terminal transmits data, and the number of space time streams (Nsts), the type of error correcting code (LDPC (Low Density Parity Check) etc.) to be applied, transmit power information and the like. In a case of receiving signals from multiple terminals, the access point specifies transmission powers to the terminals in order to control the signal powers from the terminals to be at the same substantially.

The Common Info field or the Per User Info field may be provided with a subfield that identifies whether the frame is TF-R or a trigger frame. Likewise, the Common Info field or the Per User Info field may be provided with a subfield for notifying the number of STA-unspecified RUs.

The trigger frame for random access (TF-R) 501 transmitted from the access point is received by terminals 1 to 8. In this example, the TF-R 501 specifies four resource units (RU#1, RU#2, RU#3, and RU#4), and every resource unit has the AID set to X. In other words, RU#1 to RU#4 are STA-unspecified RUs. However, the TF-R 501 may specify more resource units. At this time, a resource unit other than RU#1 to RU#4 may be allocated to a specific terminal (i.e., the AID of this terminal, the number of the resource unit and the like are set in the Per User Info field concerned).

Each of the terminals 1 to 8 decodes the TF-R 501 to check whether or not the usage of any of four resource units RU#1 RU#2, RU#3, and RU#4 is specified to its own terminal, and determines that all the resource units are the resource unit for random access (STA-unspecified RU) since here every resource unit has the AID set to X.

Each of terminals 1 to 8 holds a backoff count (UL-OFDMA Backoff (OBO) Count) selected randomly from a value range being not more than a contention window for UL-OFDMA (CWO) value. More specifically, the backoff count selected from a value range from 0 to the CWO value is held. The minimum value of the CWO is expressed as CWOmin, and the maximum value of the CWO is expressed as CWOmax. The CWO is selected from a range from the CWOmin to the CWOmax. Here, 31 is selected as a predetermined initial value of the CWO in terminals 1 to 8.

Each of the terminals 1 to 8 subtracts, from its backoff count, the number of STA-unspecified RUs which is specified in the TF-R 501 to update the OBO. If the OBO after the update reaches a predetermined value, the terminal acquires an access right to select the STA-unspecified RU randomly. In the embodiment, the predetermined value is 0. In this way, if the OBO count after the update reaches 0, the terminal acquires the access right. In other words, when the TF-R is received, the OBO count is subtracted by 1 (OBO count−1), and if the resulted value is equal to or less than a value obtained by subtracting 1 from the number of STA-unspecified RUs in the TF-R (the number of STA-unspecified RUs−1), the access right is acquired. In other words further, if the OBO count when the TF-R is received (OBO count before the subtraction) is equal to or less than the number of STA-unspecified RUs in the TF-R, the access right is acquired.

According to another operation example, the backoff value may be selected and held for each STA-unspecified RU. In this case, each backoff value may be decremented, and the access right may be obtained when a STA-unspecified RU with a decremented backoff value of zero or less occurs. Note that this embodiment assumes that the terminal selects and holds only one backoff value.

The Common Info field and Per User Info field of the trigger frame (also applicable to the case of TF-R) may be arranged in the physical header instead of the MAC frame. FIG. 10 shows an example of the format of the physical packet (physical frame) in this case. These fields may be arranged in a field which can be interpreted only by an UL-OFDMA compliant terminal (e.g., "HE" preamble field described above).

Here, any terminals 1 to 8 are assumed to have an uplink transmission request. The terminal having the transmission request holds the backoff count selected from the range being not more than the CWO value as described above. The first selection of the backoff count may be made when the transmission request is generated before receiving the TF-R 501, or may be triggered by the reception of the TF-R 501. If another TF-R is received before the TF-R 501 is received, the OBO count after the subtraction at that time may be used as the OBO count (the OBO count before the subtraction this time) when the TF-R 501 is received.

Figure 11:
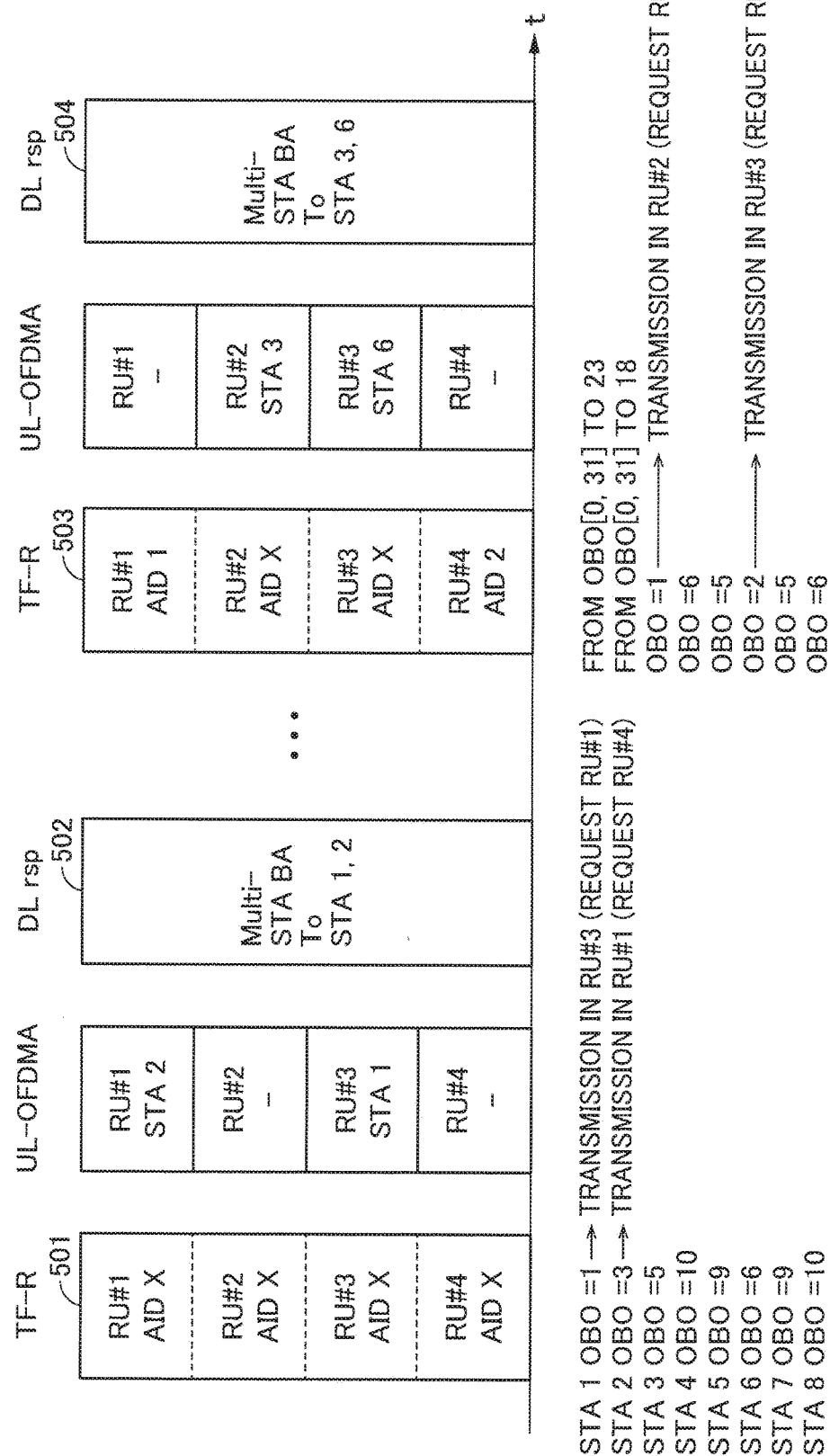
FIG. 11 is a supplementary diagram for illustrating the operation sequence of FIG. 6.

FIG. 11 is a supplementary illustration for explaining the sequence in FIG. 6, and a lateral direction along a paper plane corresponds to time and a longitudinal direction corresponds to frequency. The OBO counts of the terminals 1 to 8 (STAs 1 to 8) are STA 1 OBO=1
STA 2 OBO=3
STA 3 OBO=5
STA 4 OBO=10
STA 5 OBO=9
STA 6 OBO=6
STA 7 OBO=9
STA 8 OBO=10

The number of STA-unspecified RUs is 4 in the TF-R 501, and thus, the OBO counts after the update (subtraction) obtained by subtracting 4 from them are as below. The value below 0 is fixed to 0. In this case, the number of STA-unspecified RUs may be specified by incrementing the number of RUs with AID=X. Alternatively, in a case where the number of STA-unspecified RUs is separately described in a field, the value may be used.

STA 1 OBO=1−4=−3(→0)
STA 2 OBO=3−4=−1(→0)
STA 3 OBO=5−4=1
STA 4 OBO=10−4=6
STA 5 OBO=9−4=5
STA 6 OBO=6−4=2
STA 7 OBO=9−4=5
STA 8 OBO=10−4=6

Terminals 1 and 2 have the OBO count after the update reaching a predetermined value (=0), and thus, terminals 1 and 2 acquire the access right. Each of terminals 1 and 2 selects the resource unit randomly from RU#1 to RU#4 being STA-unspecified RUs which are specified in the TF-R 501. Here, assume that terminal 1 selects RU#3, and terminal 2 selects RU#1, randomly. The resource unit to select is one, but two or more may be permitted to be selected. Other terminals than terminals 1 and 2, which have the OBO count after the update larger than 0, cannot acquire the access right, and wait for the next transmitted TF-R.

Figure 12:
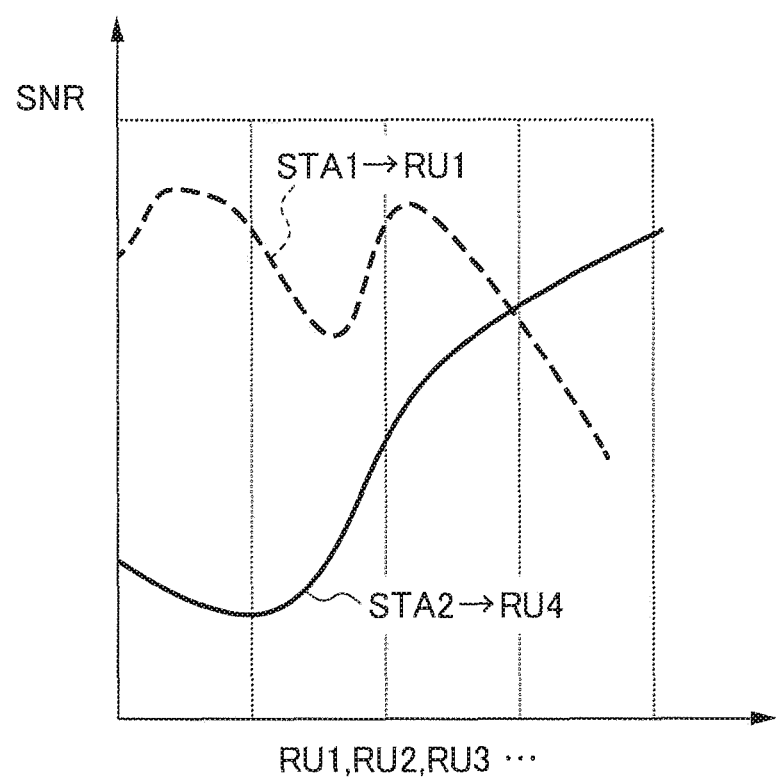
FIG. 12 is a diagram showing SNR at each terminal on a resource unit basis.

Terminals 1 and 2 determine a resource unit which is for requesting allocation from the access point or has a high communication quality. For example, the terminal measures the communication quality of each resource unit, and selects a resource unit having a communication quality which is the highest or at least a threshold. The communication quality may be measured using the received signal of the TF-R 501, or preliminarily measured therebefore. Alternatively, the access point may feed back, to each terminal, the communication quality measured from the received signal of the corresponding terminal on a resource unit basis, and the corresponding terminal may use the fed back quality. The communication quality may be, for example, SNR (Signal to Noise Ratio), RSSI (Received Signal Strength Indicator), reception EVM (Error Vector Magnitude) or the like. In this example, as shown in FIG. 12, the SNRs of the terminals 1 and 2 are measured on a resource unit basis. It is assumed that the terminal 1 selects RU#1 having the highest SNR, while the terminal 2 selects RU#4 having the highest SNR.

The terminal 1 generates a frame 511 that contains an uplink transmission request, and information on RU#1 (resource unit related information). Here, the information pertaining to RU#1 contains a request for allocating RU#1. The information pertaining to RU#1 is an example of information pertaining to RU#1 selected by the terminal 1. As described later, there may be a mode that contains information different from the request for allocating RU#1 (this is also applicable to other terminals). Likewise, the terminal 2 generates a frame 512 that contains the uplink transmission request, and information pertaining to RU#2 (resource unit related information, which herein contains a request for allocating RU#2). However, the contents of the frames 511 and 512 are not limited thereto. Alternatively, the contents of the response frame may be freely specified by TF-R.

The terminals 1 and 2 transmit the frames 511 and 512 (see FIG. 6), which are response frames, using randomly selected RU#3 and RU#1, a predetermined time period (denoted as T1) after completion of receiving TF-R 501. RU#2 and RU#4 are not selected by any terminal. Consequently, no transmission is made in RU#2 and RU#4.

Here, "Type" of the response frame is a data frame. Alternatively, this frame may be a control frame or a management frame. In the case of the data frame, the uplink transmission request and the resource unit related information may be set in the HE Control field of the data frame (as described above, a field extended from the HE Control field for IEEE 802.11ax). In this example, the terminal 1 sets the uplink transmission request and the resource unit related information in the HE Control field, and the terminal 2 sets the uplink transmission request and the resource unit related information in the HE Control field. The frame body field of the data frame is not necessarily present. Alternatively, other information may be contained in the resource unit related information as required. For example, the communication quality, statistics and the like of each resource unit may be set as the other information to be contained in the resource unit related information. The statistics may be the average or variation (variance, standard deviation or the like) of the communication quality of the resource unit, or another value. Also in a case where the "Type" of the frame is a control frame or a management frame, it is sufficient to provide a field for setting the information and the like described here. In the case of the management frame, the request or information may be set using the information element described above.

The terminals 1 and 2 generate the frames 511 and 512 according to the parameter information specified by the "Common Info" and Per User Info fields of TF-R 501. The frame (more specifically, a physical packet containing the frame) is transmitted a time period T1 after completion of receiving TF-R. Transmission of frames 511 and 512 is also a mode of UL-OFDMA. The resource unit for which the terminals 1 and 2 request allocation is the resource unit used in UL-OFDMA based on a normal trigger frame. In a case where the packet length is specified by TF-R 501 and the generated packet is less than the packet length specified by TF-R 501, padding data may be added to the end to adjust the packet length.

The frames transmitted by the terminals 1 and 2 may be aggregation frames (A-MPDU) each of which contain multiple data frames aggregated therein.

As for the time period T1, an IFS time [μs] defined beforehand may be used, as an example. The IFS time defined beforehand may be an SIFS time (=16 μs) that is a time interval of inter-frame defined by the MAC protocol specification for IEEE802.11 wireless LAN, or may be a time larger or smaller than this. A value of the time period T1 may be stored in Common Info field, Per User Info field or a MAC header, or the like in the trigger frame such that the terminal reads out this value to use. Besides, the time period T1 may be notified in advance in another way such as the beacon frame, other management frames, or the like.

The access point receives the frames 512 and 511 transmitted from the terminals 2 and 1 via the RU#1 and RU#3, and decodes the frames. The access point determines the successfulness of receiving the frames by applying an FCS test (CRC test etc.) to the decoded frames. The access point allocates the resource unit to the terminals 1 and 2. As an example, RU#1 and RU#4 in which the terminals 1 and 2 have responded are allocated to these terminals. This is because both RU#1 and RU#4 are unallocated and the frames transmitted from the terminals 1 and 2 have been successfully received. The information on the resource units allocated to the terminals 1 and 2 is preliminarily stored in a buffer, such as a memory. The resource unit allocating method may be any of various methods. The details are described later.

The access point generates the acknowledgement response frame 502 according to the test result of each frame (successfulness of reception), and transmits the frame (downlink response). Here, the access point generates single acknowledgement response frame 502 which represents acknowledgements for all the terminals 1 and 2. The access point transmits the acknowledgement response frame 502 in a basic bandwidth (here, 20 MHz) of the channel. A format of the acknowledgement response frame like this may be newly defined or the Multi-STA BA frame obtained by diverting the BA (Block Ack) frame thereto may be used. Here, the Multi-STA BA frame is transmitted.

Figure 13:
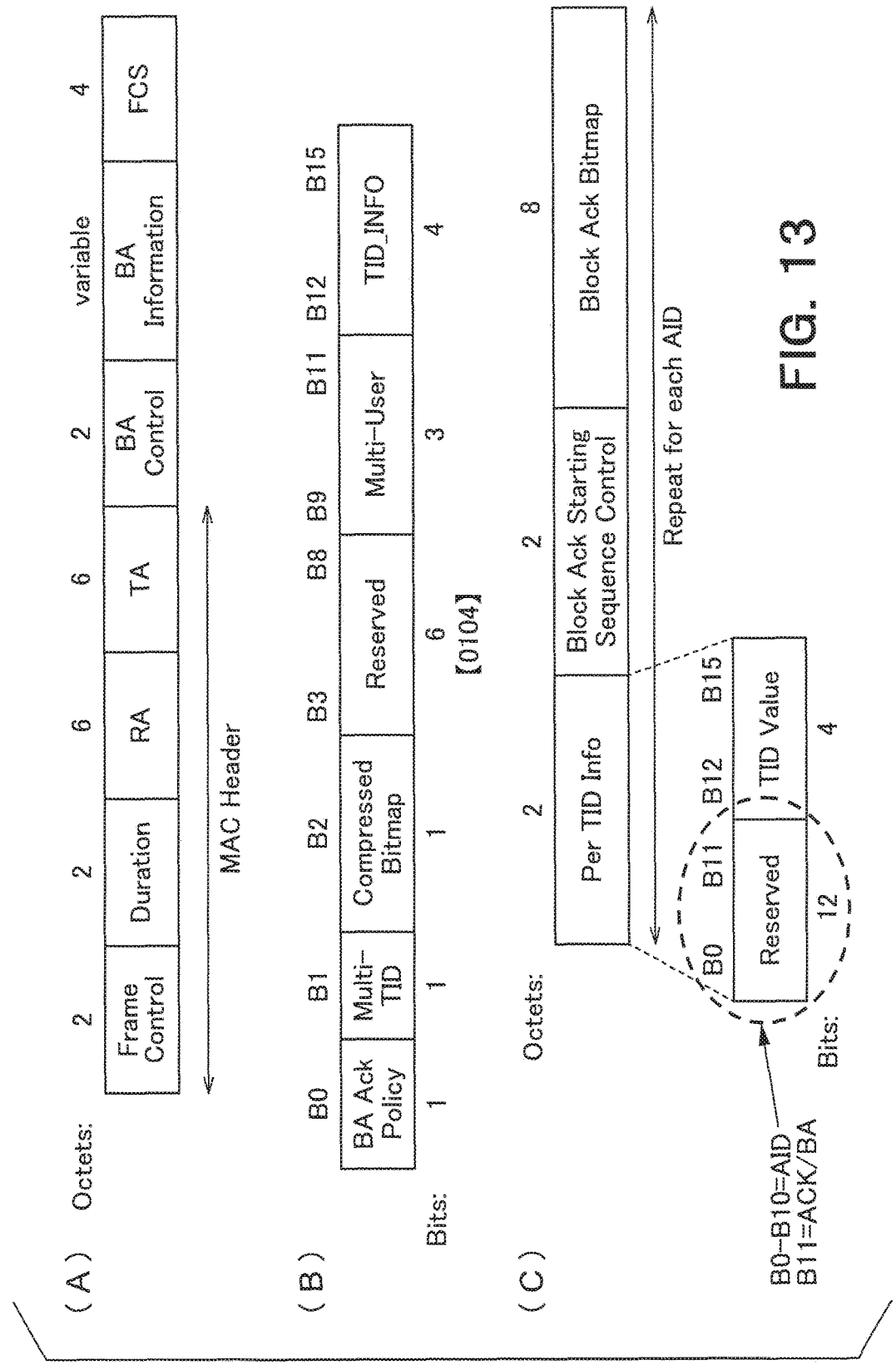
FIG. 13 is a diagram illustrating a multi-STA BA frame.

A description is given of the Multi-STA BA frame here. The Multi-STA BA frame is obtained by diverting the Block Ack frame (BA frame) thereto in order to make the acknowledgement to plural terminals by one frame. A frame type may be "Control" similarly to the ordinary BA frame, and a frame subtype may be "BlockAck". FIG. 13(A) shows an exemplary frame format in the case of reusing the Multi-STA BA frame. FIG. 13(B) shows an exemplary frame format of a BA Control field of the BA frame, and FIG. 13(C) shows an exemplary frame format of a BA Information field of the BA frame. In the case of reusing the BA frame, an indication may be in the BA Control field that the BA frame format is that extended for notifying the acknowledgement response regarding the plural wireless terminals. For example, in IEEE802.11 standard, a case where a Multi-TID subfield is 1 and a Compressed Bitmap subfield is 0 is reserved. This may be used in order to indicate that the BA frame format is extended for notifying the acknowledgement response regarding to plural wireless terminals. Alternatively, an area of bits B3-B8 is a reserved subfield in FIG. 13(B), but all or a part of this area may be defined in order to indicate that the BA frame format is that extended for notifying the acknowledgement response regarding to plural wireless terminals. Alternatively, the notification as described here may not be necessarily made explicitly.

The RA field of the Multi-STA BA frame may be set to a broadcast address or a multicast address as an example. A Multi-User subfield in the BA Control field may be set to the number of the users (number of the terminals) to be reported by means of the BA Information field. In the BA Information field, there are arranged for each user (terminal), an Association ID subfield, a Block Ack Starting Sequence Control subfield, and a Block Ack Bitmap subfield.

The Association ID subfield is set to the AID for identifying the user. More specifically, as an example, a part of a Per TID Info field is used as the subfield for the Association ID as shown in FIG. 13(C). Currently, 12 bits (from B0 to B11) are a reserved area. The first 11 bits (B0-B10) of these are used as the subfield for the Association ID. The Block Ack Starting Sequence Control subfield and the Block Ack Bitmap subfield may be omitted if the frame transmitted by the terminal is a single data frame (that is, it is not an aggregation frame). If the frame transmitted by the terminal is an aggregation frame, the Block Ack Starting Sequence Control subfield has stored therein a sequence number of the first MSDU (medium access control (MAC) service data unit) in the acknowledgement response shown by the Block Ack frame. In the Block Ack Bitmap subfield, a bitmap (Block Ack Bitmap) constituted by bits each showing reception success or failure for the sequence numbers subsequent to the Block Ack Starting Sequence number is set.

The terminal receiving the Multi-STA BA frame confirms the Type and Subtype of the Frame Control field. If the terminal detects that these are "Control" and "BlockAck", then the terminal confirms the RA field. Since the value of the RA field is the broadcast address or the like, the terminal identifies, from the Block Ack Bitmap field, the information on the acknowledgement responses (success or failure) with respect to the MPDUs (sub-frames) in the frame (here, assumed that the frame is an aggregation frame) transmitted by its own terminal to determine transmission success or failure of each sub-frame. For example, the terminal identifies the TID Info subfield storing its AID from within the BA Information field, identifies the value (starting sequence number) set in the Block Ack Starting Sequence Control subfield subsequent to the identified TID Info subfield, and identifies from the Block Ack Bitmap the transmission success or failure of each of the sequence numbers subsequent to the starting sequence number. A bit length of the AID may be shorter than a length of the TID Info subfield, and the AID may be stored in a part of the area of the TID Info subfield (e.g., the first 11 bits (B0-B10) of 2 octets (16 bits)), for example.

The case where the terminal transmits not the aggregation frame but a single frame by way of the UL-OFDMA (this case is assumed in the sequence in FIG. 6) may be made as below, for example. As shown in FIG. 13(C), one bit in the TID Info subfield of each BA Information field (e.g., the 12th bit (B11, if the first bit is B0) from the head of 2 octets (16 bits)) is used as a bit indicating "ACK" or "BA" (ACK/BA bit) and the bit is set to a value indicating "ACK". If the value indicating "ACK" is set, the Block Ack Starting Sequence Control subfield and the Block Ack Bitmap subfield are omitted. This allows notification of "ACK" for the plural terminals by means of one BA frame. The terminal of which the check result is failure is not necessary to be notified of the ACK, and thus, the notification regarding the terminal may not be made in the Multi-STA BA frame. The terminal on the receiving side does not receive the ACK for its own terminal and can determine that it has failed in the transmission. In this way, even if the plural terminals transmit either the aggregation frame or the single frame, the acknowledgement can be made with respect to the plural terminals by means of the single acknowledgement response frame obtained by diverting the BA frame thereto.

The access point, in the case of transmitting the Multi-STA BA frame 502, may transmit the Multi-STA BA frame 502 at the same frequency band as the TF-R 501 (here at a bandwidth of the basic channel width of 20 MHz, for example).

As other method than of transmitting the Multi-STA BA frame, the acknowledgement response frame (ACK frame, BA frame, or the like) may be individually transmitted for each terminal. At this time, the DL-OFDMA may be used to simultaneously transmit the acknowledgement response frames to the plural terminals. Alternatively, ACK frame transmission may be repeated an SIFS time period after receipt of BAR (BlockAck Request) frames from each terminal, thus transmitting the acknowledgement response frames sequentially on a terminal-by-terminal basis (i.e., Delayed BA setting is adopted). Alternatively, the acknowledgement response frames may be transmitted in DL-OFDMA, separately to multiple terminals.

FIG. 14 shows an exemplary structure of the physical packet in the case where the acknowledgement response frames is transmitted to the plural terminals by way of the DL-OFDMA. The L-STF, L-LTF, and L-SIG fields are, as an example, transmitted at a channel width of 20 MHz and set to the same value (same symbol) for all acknowledgement response frames each terminal headed. The SIG 1 field sets common information for a plurality of terminals and specifies, for example, the resource unit to be used for the reception by each terminal. For example, information associating the terminal identifier with the resource unit number (identifier) is set. The terminal identifier may be the Association ID (AID), a part of the AID (Partial AID), or other identifier such as the MAC address. The SIG 1 field is also transmitted at a channel width of 20 MHz, as an example. Any of the terminals can decode the SIG 1 field. The SIG 2 field is individually set for each resource unit and information on the MCS and the like which is required for decoding the corresponding data field, as an example, may be set therein. Therefore, each terminal receiving the signal from the access point can detect, by decoding the SIG 1 field, the proper resource unit to be decoded by its own terminal. Each terminal decodes the resource unit specified to its own terminal to receive the acknowledgement response frame.

Note that the exemplary format in FIG. 14 is an example, and one or more other fields may be arranged before or after the SIG 2 field, or before or after the SIG 1 field. The other fields may have a bandwidth of 20 MHz or a resource unit width. All or a part of the other fields may be constituted by known symbols similar to the L-STF and L-LTF. An SIG1 field may correspond to an HE-SIG-A field. An SIG2 field may correspond to a part of the HE-SIG-A field, or HE-SIG-B field, or both of these fields.

As a method other than that of transmitting the acknowledgement response frames to the plural terminals by way of the DL-OFDMA, the acknowledgement response frames may be transmitted to the plural terminals by way of the downlink MU-MIMO. The DL-MU-MIMO uses a technology called beam forming to form beams spatially orthogonal to each other the plural terminals for performing the transmission. The DL-MU-MIMO may be performed in accordance with IEEE802.11ac standard based on which it is defined.

The access point allocates the resource units on the basis of the frames 511 and 512 received from the terminals 1 and 2. As described above, the resource units are allocated to the terminals 1 and 2 on the basis of the allocation requests notified from the terminals 1 and 2. As described above, the terminal 1 requests RU#1, and the terminal 2 requests RU#4. Consequently, the access point allocates the terminal 1 to RU#1 while allocating the terminal 2 to RU#4.

After transmission of the multi-STA BA frame 502, the access point transmits TF-R 503 at predetermined timing or freely selected timing. It is assumed that TF-R 503 specifies RU#2 and RU#3 as STA-unspecified RUs. RU#1 and RU#4 are allocated to the terminals 1 and 2. Accordingly, the combination of the AID of the terminal 1 and RU#1, and the combination of the AID of the terminal 2 and RU#4 are respectively set in the corresponding Per User Info fields. Between transmission of the multi-STA BA frame 502 and transmission of TF-R 503, other communication may be performed.

The terminals 1 to 8 receive TF-R 503 transmitted from the access point. Terminals 1 to 8 hold the OBO count (backoff count) updated when the TF-R 501 was received last time. However, terminals 1 and 2 which performed the transmission in reply to the TF-R 501 (random access) again re-obtain the OBO count from the range from 0 to the CWO. Here, assume the CWO value is the same value 31 as that used at last time. Then, assume that terminals 1 and 2 select, from [0, 31], 23 and 18, respectively. Therefore, the OBO counts of terminals 1 to 8 (STAs 1 to 8) are as below.

STA 1 OBO=23
STA 2 OBO=18
STA 3 OBO=1
STA 4 OBO=6
STA 5 OBO=5
STA 6 OBO=2
STA 7 OBO=5
STA 8 OBO=6

The number of STA-unspecified RUs is 2 in the TF-R 503, and thus, the OBO counts after the update (subtraction) obtained by subtracting 2 from the OBO counts of the terminals are as below. The value below 0 is fixed to 0.

STA 1 OBO=23−2=21
STA 2 OBO=18−2=16
STA 3 OBO=1−2=−1(→0)
STA 4 OBO=6−2=4
STA 5 OBO=5−2=3
STA 6 OBO=2−2=0(→0)
STA 7 OBO=5−2=3
STA 8 OBO=6−2=4

Terminals 3 and 6 have the OBO count after the update reaching a predetermined value (=0), and thus, terminals 3 and 6 acquires the access right. Each of the terminals 3 and 6 selects the resource unit randomly from RU#2 to RU#3 being STA-unspecified RUs which are specified in the TF-R 503. Here, assume that terminal 3 selects RU#2 and terminal 6 selects RU#3. Other terminals than terminals 3 and 6, which have the OBO count after the update larger than 0, cannot acquire the access right.

The terminals 3 and 6 select resource units of which the terminals request allocation. It is assumed that the terminal 3 selects RU#2 and the terminal 6 selects RU#3. The terminals 3 and 6 each have an uplink transmission request. Here, the terminal selects the resource unit of which the terminal request allocation from among STA-unspecified RUs. Alternatively, a mode may be adopted that includes resource units whose allocation has been notified through the TF-R 503 (here, RU#1 and RU#4 allocated to the respective terminals 1 and 2) as selection targets. In this case, the access point sometimes reallocates the terminals 1 and 2 to RUs (the details are illustrated in Variations described later).

The terminal 3 generates a frame 513 that contains the uplink transmission request, and information (resource unit related information) pertaining to the selected resource unit (RU#2). The resource unit related information on the terminal contains a RU#2 allocation request. The terminal 6 generates a frame 516 that contains the uplink transmission request, and information (resource unit related information) pertaining to the resource unit (RU#3). The resource unit related information on the terminal 6 contains a RU#3 allocation request.

The terminals 3 and 6 transmit frames 513 and 516, which are response frames, using RU#2 and RU#3, a predetermined time period after completion of receiving the TF-R 503. The type and generation method of frames transmitted by the terminals 3 and 6 are analogous to those of frames 511 and 512 transmitted by the terminals 1 and 2 described above.

Meanwhile, the terminals 1 and 2 detect the respective Per User Info fields in which the AIDs of the own terminals are set, on the basis of the TF-R 503 received from the access point, and analyze the detected fields, thereby recognizing that RU#1 and RU#4 are allocated to the respective terminals. In the diagram, for the sake of convenience, the AID of the terminal 1 is denoted as "AID 1", and the AID of the terminal 2 is denoted as "AID 2".

When the terminals 1 and 2 request change in resource unit allocation, frames containing the requests may be transmitted in the respective RU#1 and RU#4 the time period T1 after completion of receiving the TF-R 503. Alternatively, in a case of consent to the allocation to the own terminal, a frame containing this consent may be transmitted. The type of the frame may be a management frame or a control frame. The format of the frame may be freely defined. In the case of the data frame, a subfield for setting this consent may be defined in the HE Control field. Alternatively, a configuration that does not respond to TF-R 503 may be adopted.

The access point receives the frames 523 and 526 transmitted from the terminals 3 and 6 via the RU#2 and RU#3, and decodes the frames. The access point determines the successfulness of receiving the frames by applying an FCS test (CRC test etc.) to the decoded frames. The access point allocates the resource units to the terminals 3 and 6. The information on the resource units allocated to the terminals 3 and 6 is stored in a buffer, such as a memory, in association with the AIDs of the terminals 3 and 6.

The access point generates the acknowledgement response frame according to the test result of each frame (successfulness of reception), and transmits the frame (downlink response). As with the above description, a multi-STA BA frame 504 is transmitted as a single acknowledgement response frame that represents acknowledgement of all the terminals 3 and 6. The operation of the terminal having received the multi-STA BA frame 504 is analogous to the case of the multi-STA BA frame 502. Upon receipt of the responses to the TF-R 503 from the terminals 1 and 2, the acknowledgement information to the terminals 1 and 2 may be contained in the multi-STA BA frame 504.

In the sequence described above, to transmit securely the frame to the access point even when a random access terminal performs random access in a resource unit with a low communication quality, low MCS (transmission rate) may be specified to each terminal by TF-R. For example, an instruction that specifies a predetermined MCS and selects an MCS from among MCSs of a predetermined value or less may be set in TF-R in a terminal-by-terminal basis (or common to the terminals). Alternatively, the MCS used by the terminal for random access may be predetermined. This configuration may be determined by the standard or system, or notified by the access point to the terminals belonging to BSS through a management frame, such as a beacon frame. Alternatively, the communication quality of the random access resource unit is measured by the terminal (or preliminarily measured or obtained), and the MCS to be used is determined according to the communication quality.

Figure 15:
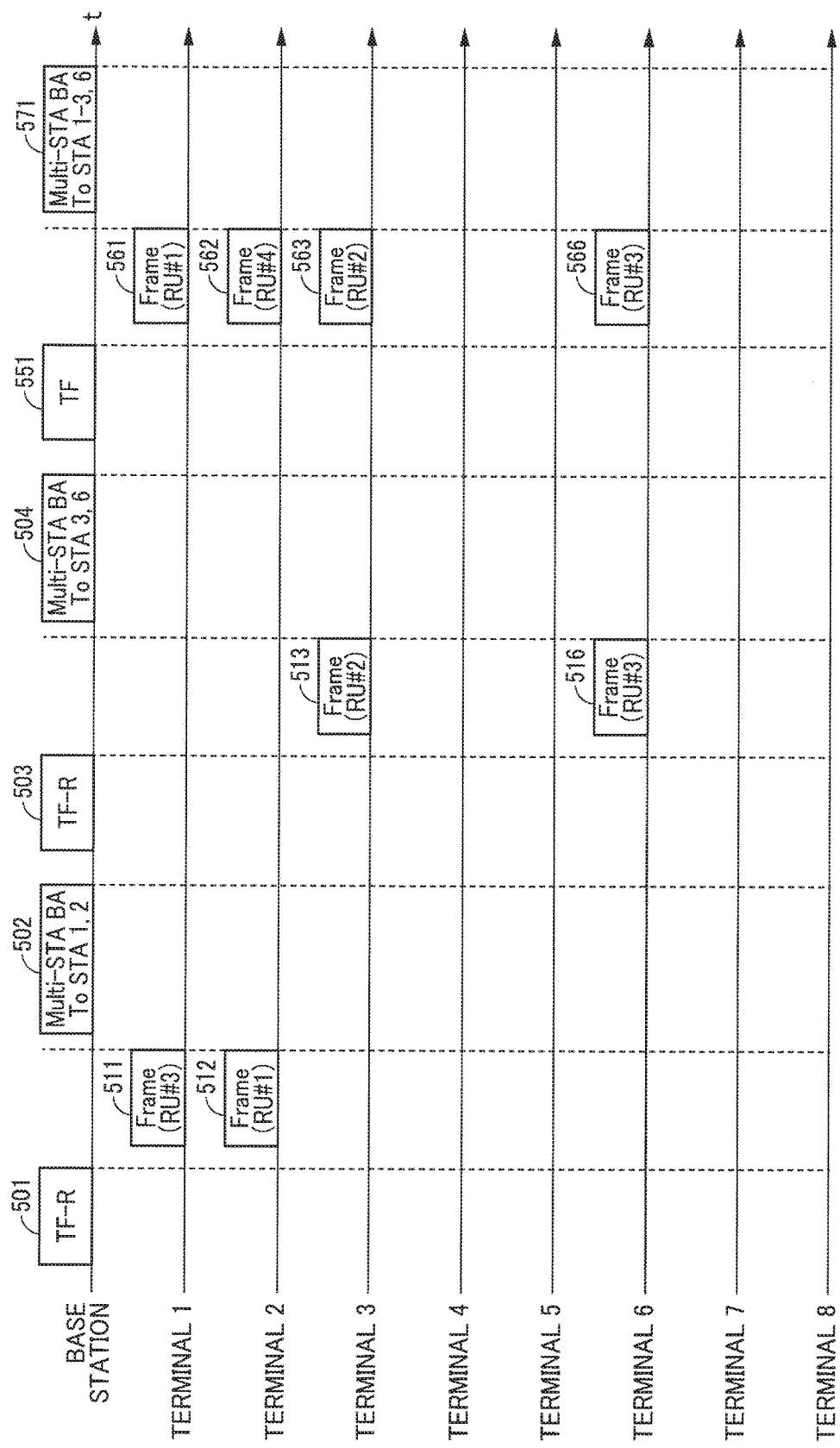
FIG. 15 is a diagram showing another example of the operation sequence according to the first embodiment.

According to the sequence described above, the access point allocates RU#1, RU#4, RU#2 and RU#3 to the respective terminals 1, 2, 3 and 6. Subsequently, the access point transmits the (non-TF-R) trigger frame on the basis of the allocation result, thereby causing the terminals 1, 2, 3 and 6 to transmit data in UL-OFDMA. FIG. 15 shows an example of addition of this sequence to FIG. 6.

In FIG. 15, the access point generates a trigger frame 551 that specifies RU#1, RU#4, RU#2 and RU#3, for the respective terminals 1, 2, 3 and 6. The format example of the trigger frame 551 is as previously shown in FIGS. 8 and 9. Pieces of parameter information to be separately specified to the terminals 1, 2, 3 and 6 (containing AID, RU number, etc.) are respectively set in the corresponding Per User Info fields, and information to be specified commonly to these terminals is set in the Common Info field, thereby generating the trigger frame 551. "Address1" field may be for a broadcast address or a multicast address. "Address1" may be the MAC address of the access point (BBIS). Alternatively, a configuration may be considered where one or both "Address1" and "Address2" are omitted. "Type" in the "Frame Control" field may be set to "Control". A value newly defined for the trigger frame may be used for "Subtype".

As described above, the "Subtype" values may be the same between the TF-R and a normal trigger frame. Alternatively, the values may be defined to be different from each other. A value for identifying the trigger frame and TF-R from each other may be set in the Common Info field or the like, or not necessarily set. In the case where the "Subtype" value is the same and there is no value discriminating both fields from each other, it may be discriminated whether the frame is TF-R or the trigger frame according to whether the STA-unspecified RU is specified. In this embodiment, in the case where TF-R specifies the resource unit and the terminal, the terminal does not transmit data as a response to TF-R. In another operation example, the data may be transmitted (in this case, there is no need to discriminate TF-R and the trigger frame from each other). In this case, to cause the end to conform to the length of the frame transmitted by the random access terminal, the transmissible data length can be shortened, or a large-sized padding can be required at the end of the frame to be transmitted by the random access terminal.

The terminals 1 to 8 having received the trigger frame 551 searches for the Per Info fields containing the AIDs of the own terminals, and the terminals 1, 2, 3 and 6 can detect the field but the terminals 4, 5, 7 and 8 cannot detect the field. The terminals 1, 2, 3 and 6 generate data frames 561, 562, 563 and 566 which contain the data to be subjected to uplink transmission (and may be aggregation frames concatenating multiple data frames,) according to information contained in the Common Info field and the Per User Info field for the terminals themselves. The terminals 1 to 3 and 6 transmit the data frames (more specifically, the physical packets containing the frames) 561, 562, 563 and 566 a time period T2 after completion of receiving the trigger frame 551. That is, the terminals 1, 2, 3 and 6 transmit data in UL-OFDMA based on the trigger frame 551.

As for the time period T2, an IFS time [μs] defined beforehand may be used, as an example. The IFS time defined beforehand may be an SIFS time (=16 μs) that is a time interval of inter-frame defined by the MAC protocol specification for IEEE802.11 wireless LAN, or may be a time larger or smaller than this. A value of the time period T2 may be stored in Common Info field, Per User Info field or a MAC header, or the like in the trigger frame such that the terminal reads out this value to use. Besides, the time period T2 may be notified in advance in another way such as the beacon frame, other management frames, or the like. The value of the time period T2 may be same as that of the time period T1 or a value of a time length different from that of the time period T1.

The access point receives the frames 561, 563, 566 and 562 transmitted from the terminals 1, 3, 6 and 2 via the RU#1, 2, 3 and 4, and decodes the frames. The access point determines the successfulness of receiving the frames by applying an FCS test (CRC test etc.) to the decoded frames. The access point generates the acknowledgement response frame 571 according to the test result of each frame (successfulness of reception), and transmits the frame (downlink response). Here, the access point generates the multi-STA BA frame that contains acknowledgements of all the terminals 1, 2, 3 and 6. The access point transmits the multi-STA BA frame 571 in a basic bandwidth (here, 20 MHz) of the channel.

The terminals 1, 2, 3 and 6 identify the AID field (the subfield of "Per TID Info" field) in which the AID of the own terminal on the basis of the acknowledgement response frame 571, and verify the acknowledgement information on each data frame from the corresponding "Block Ack Bitmap" (in a case of transmission of the aggregation frame in which multiple data frames are aggregated). When a single data frame is transmitted, it is determined that the data frame has been successfully transmitted, by verifying that the value of "ACK/BA" subfield of the "Per TID Info" field is a value indicating the ACK as described above. When transmission of the single data frame has failed, the AID field in which the AID of the terminal concerned is set is absent. Consequently, failure in transmission may be determined by detecting absence of the AID of the own terminal.

According to the sequence described above, each terminal includes a request for allocating the resource unit selected by the corresponding terminal into the response frame to be transmitted through random access in response to the TF-R, and the access point allocates the resource unit to the corresponding terminal on the basis of the request. Consequently, the resource unit suitable to each terminal can be allocated, allowing highly efficient UL-OFDMA to be achieved. Furthermore, according to this sequence, the request for allocating the selected resource unit is included in the frame to be transmitted through random access. Consequently, notification can be efficiently made, and increase in communication overhead can be suppressed (as described later, a configuration may be adopted that transmits the resource unit related information, such as the allocation request, before TF-R at the first time).

Figure 16:
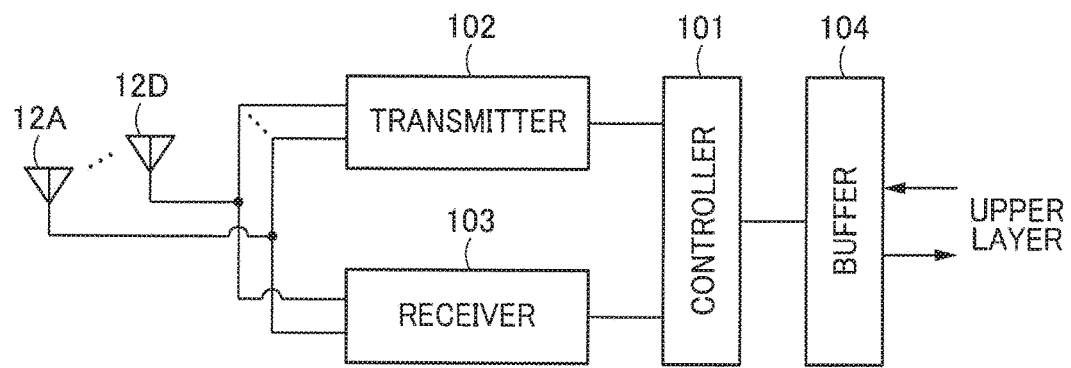
FIG. 16 is a functional block diagram of a wireless communication device mounted on an access point (base station) according to the first embodiment.

FIG. 16 is a functional block diagram of the wireless communication device in the access point 11. As described above, the access point 11 is connected to at least the network on the side of the terminals 1 to 8 shown in FIG. 1, and may be connected to a network other than this network. FIG. 16 shows the configuration of the wireless communication device connected to the network on the side of the terminals 1 to 8.

The wireless communication device in the access point includes a controller 101, a transmitter 102, a receiver 103, antennas 12A, 12B, 12C and 12D, and a buffer 104. The number of the antennas is four although the number may be one or more. The controller 101 corresponds to controlling circuitry or a baseband integrated circuitry which controls communication with the terminals, and the transmitter 102 and the receiver 103 form a wireless communicator or an RF integrated circuitry which transmits and receives frames via the antenna as an example. A process of the controller 101, and all or a part of a digital region process of the transmitter 102 and receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and receiver 103.

The buffer 104 is a storage for transferring a frame such as the data frame between an upper layer and the controller 101. The buffer 104 may be a volatile memory such as a DRAM or a non-volatile memory such as a NAND, or an MRAM. The upper layer stores the frame received from the second network in the buffer 104 for relaying to the first network, or takes in, from the controller 101, the frame received from the first network or a payload thereof via the buffer. The upper layer may perform an upper communication process than a MAC layer such as a TCP/IP or a UDP/IP. Alternatively, the TCP/IP or a UDP/IP may be performed in the controller 101 and the upper layer may also perform a process of an application layer of processing the data. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer (e.g., a process concerning the OFDMA or the like). The controller 101 transmits and receives the frame via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the terminal, performs an authentication process to exchange required information on capability or an attribute etc. each other (which may include capability information of whether the terminal or the access point has capability to carry out OFDMA) and establishes the wireless link with the terminal. The controller 101 may perform a process such as an authentication process if necessary before receiving the association request. The controller 101 periodically checks the buffer 104. Alternatively, the controller 101 checks the buffer 104 by an external trigger such as the buffer 104.

A controller 101 determines the start of UL-OFDMA at any timing, and generates the trigger frame (TF-R) for random access. The details thereof are described above. The correspondence relationship between the resource units and the numbers (identifiers), and information pertaining to the channel to be used in OFDMA and the band may be preliminarily notified to the terminal, or be determined by the system or standard. Information on a part or all thereof may be notified through TF-R. The controller 101 may set information that specifies a period (TXOP) of continuing the subsequent sequence in the physical header or the Common Info field in the TF-R. Alternatively, the TXOP may be set, as medium reservation period, in the "Duration/ID" field of the MAC header.

The controller 101 transmits the generated TF-R from a transmitter 102 in a 20 MHz channel width receivable by a legacy terminal, for example. For example, carrier sensing is performed according to CSMA/CA before transmission. When the access right to the wireless medium is obtained, TF-R is transmitted to the transmitter 102. The transmitter 102 applies desired processes on the physical layer, such as coding and modulation processes and addition of the physical header, to the input TF-R, thereby generating the physical packet. Furthermore, DA conversion, a filter process of extracting a desired band component, frequency conversion (up-convert) and the like are applied to the physical packet. A signal obtained therethrough is amplified by a preamplifier, and emitted as radio waves from one or more antennas. Alternatively, a transmission system may be provided for each antenna, and a process on the physical layer is performed for each transmission system to transmit the same signal at the same time, or only a single transmission system may be used for transmission. Alternatively, multiple antennas can be used to control the directivity of transmission.

The signal received by each antenna in the access point is processed in the receiver 103 for each reception system corresponding to the each antenna. For example, after transmission of TF-R, the signals of the frames simultaneously transmitted (transmitted in OFDMA) through random access from one or more terminals are simultaneously received by the antennas. The frame received from each terminal contains the uplink transmission request and the resource unit related information (e.g., including the request for allocating the resource unit selected by the terminal), for example. The received signal of each antenna is amplified by a low noise amplifier (LNA) in the corresponding reception system, is subjected to frequency conversion (down-convert), and is subjected to a filtering process, thereby allowing a desired band component to be extracted. Each extracted signal is further converted into a digital signal through AD conversion, is subjected to processes on the physical layer such as decoding and error correction decoding, a process for the physical header and the like. Subsequently, the frame is input into the controller 101. Here, the corresponding frequency bands may be different according to respective reception systems. The reception systems may be arranged on a resource unit basis. Alternatively, the reception systems correspond to the same frequency band, and signals received by the reception systems may be combined by a diversity technology. In this case, the signal in each resource unit may be extracted by a digital filtering process. In a case where OFDMA reception is not performed, reception can be performed according to a configuration where only one antenna is connected to a receiver 103 and the remaining antennas are not connected to the receiver 103.

The controller 101 applies the CRC test to the frames simultaneously received from the terminals (in the case of aggregation frame, the CRC test is applied to multiple data frames in the aggregation frame). The controller 101 allocates the resource units to the terminals on the basis of the uplink transmission request and the resource unit related information contained in frames received from the terminals. The information on the resource units allocated to the terminals is stored in a buffer 104, or another buffer such as an accessible memory, in association with the AIDs of the terminals.

Upon lapse of a predetermined time after completion of receiving the frame from each terminal, the controller 101 performs control so as to transmit the acknowledgement response frame and transmit the acknowledgement response frame in the band of the channel width from the transmitter 102. The transmitter 102 applies desired processes on the physical layer, such as coding and modulation processes and addition of the physical header, to the acknowledgement response frame, thereby generating the physical packet. Furthermore, DA conversion, a filter process of extracting a desired band component, frequency conversion (up-convert) and the like are applied to the physical packet. A signal obtained therethrough is amplified by a preamplifier, and emitted as radio waves from one or more antennas to space.

The type and transmission method of the acknowledgement response frame are as described above. Information on the resource unit allocated to each terminal may be included in the acknowledgement response frame.

In a case of transmitting the next TF-R, the controller 101 performs transmission of TF-R, reception of the response frame, allocation of the resource unit, transmission of the acknowledgement response frame and the like, as described above. After the resource unit to be allocated to each terminal on the basis of at least one TF-R, the trigger frame that specifies the combination of each terminal and the corresponding resource unit is generated in order to transmit data in UL-OFDMA, and the transmission is thus performed via the transmitter 102. The details of the trigger frame are as described above. The controller 101 receives the data frame, which may be an aggregation frame, from each terminal specified by the trigger frame in the corresponding resource unit via the receiver 103. The controller 101 performs the CRC test on the data frame of each terminal, and generates the acknowledgement response frame containing the acknowledgement information on each terminal. A predetermined time period after completion of receiving the trigger frame, the acknowledgement response frame is transmitted. Various modes may be adopted as the type and transmission method of the acknowledgement response frame, as described above.

The controller 101 may access a storage for storing the information to be transmitted via the TF-R or the trigger frame etc. to the terminals or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and transmitter 102 is an example, and another form may be used. For example, the controller 101 may perform the process until the digital region process and the DA conversion, and the transmitter 102 may perform process subsequent to the DA conversion. As for the isolation of the processes of the controller 101 and receiver 103, similarly, the receiver 103 may perform the process before the AD conversion and the controller 101 may perform the digital region process including processes following the AD conversion. Isolation other than those described above may be used. As one example, the baseband integrated circuit in accordance with this embodiment corresponds to the controller 101, the section that carries out the processing of the physical layer and the section that carries out the DA conversion in the transmitter 102, and the section that carries out the processing processes including and following the AD conversion in the receiver 103. The RF integrated circuit corresponds to the section that carries out the processing processes including and following the DA conversion in the transmitter 102 and the section that carries out the processing processes prior to the AD conversion in the receiver 103. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 17:
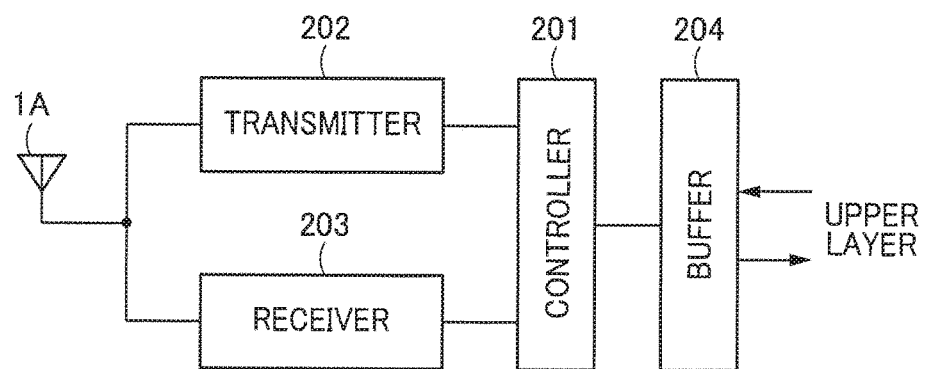
FIG. 17 is a functional block diagram of a terminal-mounted wireless communication device according to the first embodiment.

FIG. 17 is a functional block diagram of the wireless communication device installed in the terminal. All the wireless communication devices mounted on the terminals 1 to 8 in FIG. 1 have the configuration in FIG. 17.

The wireless communication device includes a controller 201, a transmitter 202, a receiver 203, at least one antenna 1, and a buffer 204. The controller 201 corresponds to controlling circuitry or a baseband integrated circuit which controls communication with the access point 11, and the transmitter 202 and the receiver 203 form a wireless communicator or an RF integrated circuit which transmits and receives frames as an example. A process of the controller 201, and all or a part of a digital region process of the transmitter 202 and receiver 203 may be performed by software (program) executing on a processor such as a CPU, or may be performed by hardware, or may be performed by the both of the software and the hardware. The terminal may include a processor performing the process of the controller 201, all or a part of the transmitter 202 and receiver 103.

The buffer 204 is a storage for transferring a frame such as the data frame between an upper layer and the controller 201. The buffer 204 may be a volatile memory such as a DRAM or a non-volatile memory such as a NAND, or an MRAM. The upper layer generates the frames or data to be transmitted to other terminals, the access point 11, or a device on another network such as a server and stores the generated frames in the buffer 204, or takes in, via the buffer 204, the frames received from other terminals, the access point 11, or a device on another network such as a server. The upper layer may perform an upper communication process than a MAC layer such as a TCP/IP or a UDP/IP. The TCP/IP or the UDP/IP may be performed in the controller 201 and the upper layer may perform a process of an application layer of processing the data. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point 11 to control the communication with the access point 11. The controller 201 receives via the antenna 1 and the receiver 203 a beacon frame periodically transmitted from the access point 11, for example. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, receives the beacon frame to detect the attribute and synchronization information of BSS of the access point 11 and then transmits an association request to the access point 11 to perform an association process in response to the received beacon. Thereby, the control 201 exchanges required information on capability or an attribute etc. each other (which may include capability information of whether the terminal or the access point has capability to carry out OFDMA) and establishes the wireless link with the access point 11. The controller 201 may perform a process such as an authentication process if necessary before transmitting the association request. The controller 201 periodically checks the buffer 204. Alternatively, the controller 201 checks the buffer 204 by an external trigger such as the buffer 204. Thereby, controller 201 checks whether data to be transmitted exist in the buffer 204. The controller 201, after confirming there are the frames or data to be transmitted to the access point 11, acquires an access right into the radio medium (transmission right) based on CSMA/CA etc. and transmits the frame via the transmitter 202 and the antenna 1 in accordance with the communication scheme of use.

A transmitter 202 applies desired processes on the physical layer, such as coding and modulation processes and addition of the physical header, to the frame input from the controller 201, thereby generating the physical packet. Furthermore, DA conversion, a filter process of extracting a desired band component, frequency conversion (up-convert) and the like are applied to the physical packet. A signal obtained therethrough is amplified by a preamplifier, and emitted as radio waves from one or more antennas to space. In a case where multiple antennas are provided, a transmission system may be provided for each antenna, and a process on the physical layer is performed for each transmission system to transmit the same signal at the same time. Alternatively, multiple antennas can be used to control the directivity of transmission.

The signal received by the antenna 1A is processed in the receiver 203. The received signal is amplified by a low noise amplifier (LNA) in the receiver 203, is subjected to frequency conversion (down-convert), and is subjected to a filtering process, thereby allowing a desired band component to be extracted. Each extracted signal is further converted into a digital signal through AD conversion, and is subjected to the processes on the physical layer, such as decoding and error correction decoding, and physical header processing are applied. Thereby, the frame, such as a data frame, is input into the controller 201.

The controller 201 holds a backoff value (UL-OFDMA backoff (OBO) count) randomly selected from a range equal to or less than the contention window for UL-OFDMA (CWO) value. More specifically, this controller holds the backoff value selected from the range of values which is at least zero and equal to or less than CWO count. The minimum value of CWO is denoted as CWOmin, and the maximum value of CWO is denoted as CWOmax. CWO is selected from the range which is at least CWOmin and equal to or less than CWOmax. The controller 201 manages the CWO, backoff value (OBO count), CWOmin and CWOmax. These values are stored in a buffer 204 or another buffer, such as an accessible memory.

Upon receipt of TF-R from the access point 11, the controller 201 updates OBO by subtracting the number of STA-unspecified RUs specified by TF-R from the backoff value (OBO). The selection and holding of the backoff value at the first time may be performed at the time of TF-R reception at the first time. When the updated OBO reaches a predetermined value, the access right to the STA-unspecified RU is obtained. When the updated OBO does not reach the predetermined value, the next TF-R is waited for. When the AID of the own terminal is specified in the AID field in the TF-R, the resource unit allocated to the own terminal may be grasped from the RU allocation information field.

When the controller 201 obtains the access right according to OBO reaching the predetermined value, the resource unit is randomly selected from among the STA-unspecified RUs, and the resource unit whose allocation is required is selected. A frame in which the request for allocating the selected resource unit and the uplink transmission request are set is generated. A certain time period after completion of receiving TF-R, the frame (more specifically, the physical packet containing the frame) is transmitted in a randomly selected resource unit via the transmitter 202.

The controller 201 receives the acknowledgement response frame via a receiver 203 a certain time period such as SIFS after completion of frame transmission, and determines the successfulness of frame transmission. In a case where information on the resource unit allocated to the random access terminal is set in the acknowledgement response frame, the resource unit allocated to the own terminal may be grasped from the acknowledgement response frame.

Upon receipt of the trigger frame from the access point via the receiver 203, the controller 201 tests the presence or absence of the AID field in which the AID of the own terminal is set, on the basis of the trigger frame. In the case of presence, the resource unit allocated to the own terminal is specified from the RU allocation information field, and other parameter information is specified from the STA PHY parameter field, Common Info field and the like. In a case where the allocation of resource unit to the own terminal is notified through the acknowledgement response frame or TF-R, there is a possibility that this allocation have been changed through the trigger frame (for the details, see Variations described later).

In a case where the own terminal is specified through the trigger frame, the controller 201 generates a data frame, which may be an aggregation frame, on the basis of the data to be transmitted in the buffer 204. In a case of presence of parameter information such as the packet length (PPDU length etc.) specified through the trigger frame, the processing is according to the information. In a case of data for transmission with a length less than the packet length specified by the trigger frame, padding data may be added to the end of the frame. The controller 201 transmits the data frame via the transmitter 202 in the resource unit specified to the own terminal by the trigger frame a certain time period after completion of receiving the trigger frame. In a case where the amount of adjustment of timing for transmission is specified by the parameter information, transmission is made at timing deviating from the time point a certain time period after completion of receiving TF-R. The data frame is transmitted as the physical packet via the transmitter 202 and an antenna 1A.

The controller 201 receives, via the receiver 203, the acknowledgement response frame transmitted from the access point 11, a certain time period such as SIFS after completion of data frame transmission. The controller 201 determines the successfulness of transmission of the data frame (each of aggregated data frames in a case of an aggregation frame). The reception process is performed according to the type of the acknowledgement response frame. In a case where the acknowledgement response frame (the BA frame, ACK frame, etc.) is transmitted to individual terminal in DL-OFDMA, the resource unit of the own terminal is specified from a predetermined field (SIG1 field in FIG. 14 etc.) of the physical header. The signal of the resource unit may then be decoded to obtain the acknowledgement response frame.

The controller 201 performs a process of retransmitting the data frame determined to have failed, as required. Any method may be adopted as the retransmitting method. For example, reception of the next trigger frame is waited for, and transmission may be performed in response thereto. Alternatively, the access right may be obtained on a CSMA/CA basis or through transmission and reception of the RTS frame and the CTS frame, and the data frame is retransmitted through single user communication. Alternatively, in a case of a mechanism where the own terminal and the resource unit allocation are specified in TF-R and data is allowed to be transmitted in response thereto, the data frame is allowed to be transmitted in response to this TF-R.

Here, the case is mainly exemplified where the frame transmitted in UL-OFDMA based on the trigger frame is the data frame. Alternatively, the frame may be a management frame or a control frame.

The controller 201 may access a storage device that stores either information to be notified to the access point 11 or the information notified from the access point 11 or both of these pieces of information and read the information. The storage device may be an internal memory device, an external memory device, a volatile memory device, or a non-volatile memory. Also, the storage devices such as an SSD and a hard disk may be used in place of the memory device.

Figure 18:
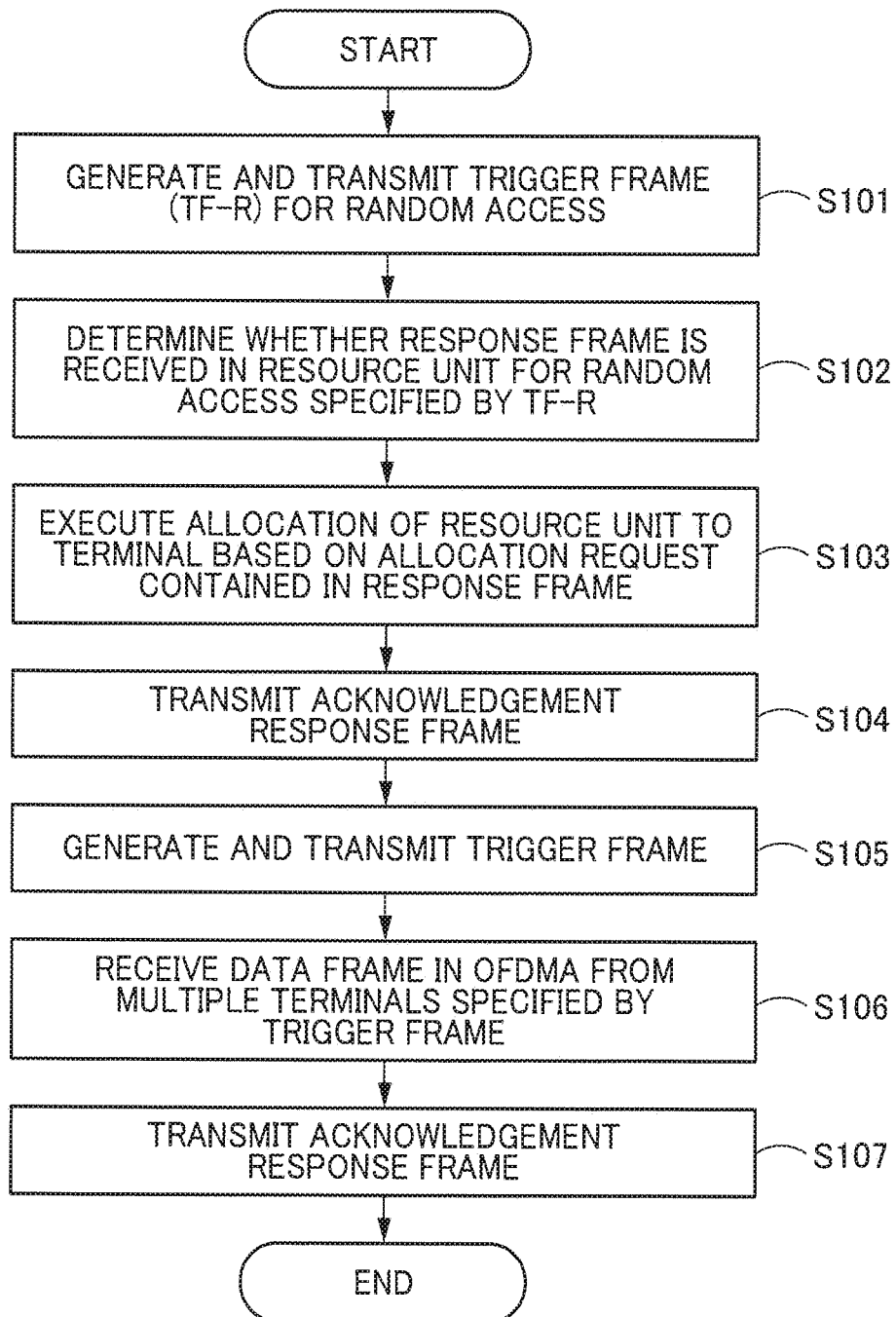
FIG. 18 is a diagram showing a flowchart of an operation of the access point according to the first embodiment.

The above described isolation of the processes of the controller 201 and transmitter 202 is an example, and another form may be used. For example, the controller 201 may perform the process until the digital region process and the DA conversion, and the transmitter 202 may perform process subsequent to the DA conversion. As for the isolation of the processes of the controller 201 and receiver 203, similarly, the receiver 203 may perform the process before the AD conversion and the controller 201 may perform the digital region process including processes following the AD conversion. Isolation other than those described above may be used. As one example, the baseband integrated circuit in accordance with this embodiment corresponds to the controller 201, the section that carries out the processing of the physical layer and the section that carries out the DA conversion in the transmitter 202, and the section that carries out the processing processes including and following the AD conversion in the receiver 203. The RF integrated circuit corresponds to the section that carries out the processing processes including and following the DA conversion in the transmitter 202 and the section that carries out the processing processes prior to the AD conversion in the receiver 203. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described FIG. 18 is a diagram showing a flowchart of an operation at the access point according to the first embodiment.

The controller 101 of the access point generates and transmits the trigger frame (TF-R) for random access (S101). In TF-R, AIDs (denoted as "X" in this embodiment for the convenience sake) unallocated to any terminal are specified to the respective resource units. Thus, each resource unit is recognized, by the terminal having received TF-R, to be an STA-unspecified RU and be randomly accessible. The details of configuration and generation method of TF-R are as described above.

The controller 101 determines whether the response frame to TF-R is received in each resource unit (STA-unspecified RU) (S102). The response frame contains the uplink transmission request, and the resource unit related information, for example. The resource unit related information contains an allocation request for the resource unit selected by the terminal. The controller 101 allocates the resource unit to the source terminal of the received response frame on the basis of the allocation request by the terminal (S103). For example, when the same resource unit is not requested between multiple terminals, requested resource units are allocated. For example, when the same resource unit is requested between multiple terminals, allocation and the like are performed according to the operation of Variation described later.

The controller 101 transmits the acknowledgement response frame to one or more terminals having transmitted the response frame (S104). For example, the multi-STA BA frame which collectively contains pieces of acknowledgement information to multiple terminals may be transmitted. Alternatively, the ACK frame and the BA frame are transmitted sequentially on a terminal-by-terminal basis or simultaneously in DL-OFDMA. The acknowledgement response frame may contain information that specifies the resource unit allocated to each terminal. Note that a mode where transmission of the acknowledgement response frame is omitted may be adopted.

Returning to step S101 as required, transmission of TF-R, reception of the response frame, and resource unit allocation are performed. In a case of presence of a resource unit for random access having already been allocated at the second time of TF-R transmission or thereafter, information that specifies the allocated terminal and the resource unit may be set in TF-R.

When the allocation of the terminal to each resource unit is determined, the controller 101 generates the trigger frame and transmits the trigger frame to the transmitter 102 (S105).

The controller 101 waits for reception of the data frames, which may be an aggregation frame, from multiple terminals specified by the trigger frame in the specified resource unit. The controller 101 receives, via the receiver 103, the data frame OFDMA-transmitted from these terminals (S106).

The controller 101 tests whether the data frame has been successfully received (CRC test etc.). The controller 101 generates the acknowledgement response frame on the basis of the test result (CRC result) pertaining to the successfulness of reception of the data frame (S107). The acknowledgement response frame is transmitted a certain time period such as SIFS after completion of OFDMA reception. For example, the multi-STA BA frame which collectively contains pieces of acknowledgement information to multiple terminals may be transmitted. Alternatively, the ACK frame and the BA frame are transmitted sequentially on a terminal-by-terminal basis or simultaneously in DL-OFDMA.

Figure 19:
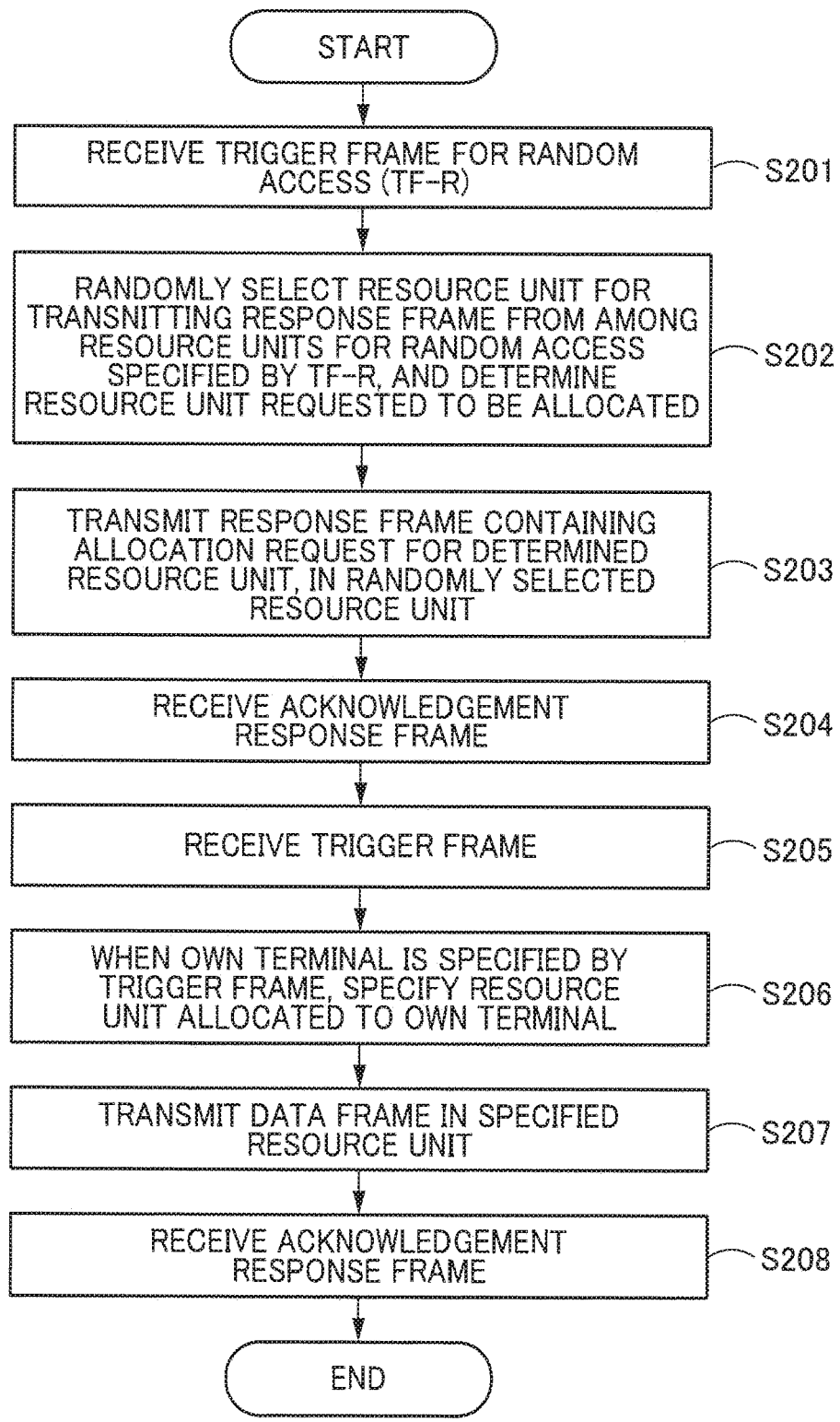
FIG. 19 is a diagram showing a flowchart of an operation of the terminal according to the first embodiment.

FIG. 19 is a flowchart of an operation of a terminal according to the first embodiment.

The controller 201 of the terminal receives, via the receiver 203, the trigger frame (TF-R) for random access transmitted from the access point (S101).

The controller 201 randomly selects the resource unit to be accessed, from among the resource units (STA-unspecified RUs) for random access specified by TF-R (S202). The resource unit requested to be allocated is determined on the basis of the communication quality and the like of the resource unit (S202).

The controller 201 generates a response frame that contains the allocation request and the uplink transmission request of the determined resource unit (S203). The controller 201 transmits the frame via the transmitter 202 in the randomly selected resource unit a predetermined time period after completion of receiving TF-R (the same S203).

The controller 201 receives the acknowledgement response frame a certain time period such as SIFS after completion of transmitting the response frame (S204).

Subsequently, when the controller 201 receives the trigger frame from the access point (S205), the controller 201 determines whether the own terminal is specified (the AID of the own terminal is set in the AID field in the Per User Info field). When the own terminal is specified, the resource unit allocated to the own terminal is confirmed from the "RU Allocation Info" field (S206).

When the own terminal is specified by the trigger frame, the controller 201 generates the data frame, which may be an aggregation frame, and transmits the data frame via the transmitter 202 in the resource unit specified by the trigger frame (S207). The generation and transmission of the data frame are according to various pieces of parameter information specified by the trigger frame.

The controller 201 receives the acknowledgement response frame a certain time period such as SIFS after completion of transmitting the data frame (S208). The successfulness of data frame transmission is determined on the basis of the acknowledgement response frame.

The embodiments described above can be variously extended or changed. These are hereinafter described as Variations of this embodiment.

[First Variation]

In the embodiments described above (FIGS. 6 and 15), TF-R is transmitted twice, and the resource unit allocation is performed in two steps. However, the number of times of TF-R transmission is not limited thereto. For example, the number of times of TF-R transmission may be one, and the resource unit allocation may be determined at one time. Various modes may be adopted as follows. That is, when the number of random access terminals to TF-R transmission at the first time is at least a predetermined value, TF-R transmission at the second time and thereafter are not performed. Alternatively, TF-R transmission is repeated until the number of random access terminals reaches the predetermined value.

Note that the terminal to which the resource unit is allocated in response to TF-R may be allowed to perform random access again even in response to the next TF-R and thereafter to be transmitted before trigger frame transmission. In this case, multiple resource units may be allocated to the terminal according to the number of random accesses.

[Second Variation]

In the embodiment described above, the terminal randomly accessing TF-R transmits the resource unit allocation request through the response frame. Alternatively, only in a case where the predetermined condition is satisfied, the request for allocating the resource unit may be transmitted, and in the other cases, the request for allocating the resource unit is not necessarily transmitted. In the case without transmission of the resource unit allocation request, the resource unit to be allocated to the terminal is determined according to arbitrary determination by the access point (or determination by any of other Variations described later).

According to an example of the predetermined condition, the terminal may calculate variation (standard deviation, variance or the like) in communication quality between STA-unspecified RUs, and only in a case of variation having at least a predetermined value, the resource unit requested to be allocated may be selected, and a resource unit allocation request may be transmitted. In a case where the variation is less than the predetermined value, the resource unit allocation request is not transmitted. In a case where the variation is less than the predetermined value, it is assumed that the communication quality is not largely different even with use of any resource unit. Consequently, a priority is given to another terminal's allocation request for resource unit allocation at the discretion of the access point, which can achieve a highly flexible system as a whole. Meanwhile, when the variation is at least the predetermined value, the terminal specifies the resource unit to thereby secure the communication quality of the terminal and improves the efficiency as a whole, because the access point's free discretion causes a possibility of allocation of a resource unit with a low communication quality. Instead of the configuration without transmitting the resource unit allocation request, information clearly specifying that any resource unit may be allocated (without any request of the resource unit to be allocated) may be transmitted through the response frame. This information can be represented by one bit, for example.

[Third Variation]

Instead of transmitting the resource unit allocation request as the resource unit related information, the communication quality information on each resource unit may be notified to the access point. The access point determines the resource unit which is to be allocated to each terminal, on the basis of the communication quality information collected from each terminal.

Examples of the communication quality information include SNR, RSSI or reception EVM on a resource unit basis. In a case where the MCS applicable to transmission in the resource unit is determined according to the communication quality of the resource unit, the applicable MCS may be used as the communication quality of this resource unit. Instead of the value of the communication quality itself, what is obtained by classifying the values of the communication quality according to the range of values may be adopted as the communication quality information. The description in this paragraph is also applicable to the communication quality information described in other paragraphs of this specification in an analogous manner. The access point may determine the resource which is to be allocated to each terminal, on the basis of the communication quality information which is on a resource unit basis and has been collected from each terminal so as to improve the OFDMA efficiency.

Another example of the communication quality information may be the difference between the average SNR of the entire OFDMA frequency band and the SNR of each resource unit. In a case of OFDMA in 20 MHz width band, yet another example may be the difference between the SNR of the entire 20 MHz width band and the SNR of resource units included in 20 MHz width band (the resource units may be all the resource units included in the 20 MHz width band, all the resource units for random access, only resource units with the AID value of "X" at the time of TF-R reception, or resource units defined by another method). The SNR is only an example. Alternatively, another indicator, such as RSSI, may be adopted. The access point may determine the resource unit which is to be allocated to each terminal, on the basis of the difference which is on a resource unit basis and has been collected from each terminal so as to improve the OFDMA efficiency.

The terminal may transmit the request for allocating the resource unit in addition to the communication quality information. In a case without any request for the same resource unit among terminals (without contention), the resource unit requested by the terminal is allocated. In a case with contention, the resource unit may be allocated in consideration of communication quality information.

The terminal may transmit information on the amount of data or data size for uplink transmission held in the buffer of the own terminal, through the response frame. The access point may allocate the resource unit to each terminal on the basis of the information on the data size. For example, the larger the data size of the terminal, the higher the quality of the resource unit may be assigned thereto. This is also applied to the embodiments described above and the other Variations in an analogous manner.

[Fourth Variation]

The terminal may calculate, as the resource unit related information, the evaluation information on the communication quality between the resource unit with the highest communication quality and the other resource units, instead of the request for allocating the selected resource unit, and transmit evaluation information through the response frame (first example). The evaluation information may be transmitted together with the request for allocating the resource unit (e.g., the resource unit with the highest communication quality).

An example of the evaluation information may be the difference between the communication quality of the resource unit having the highest communication quality and the communication quality of each of the other resource units. Alternatively, the entire average of the resource unit having the highest communication quality and the other resource units may be calculated, and the difference between this average and the communication quality of each resource unit may be adopted as the evaluation information. The communication quality of each resource unit may be measured using the reception signal of TF-R, or done according to any method before receipt of TF-R. Another method may be adopted where the communication quality of each resource unit measured at the access point on a terminal-by-terminal basis is fed back to the each terminal, and each terminal calculates the evaluation information using the communication quality of the own terminal.

The access point can allocate the resource unit using the evaluation information. For example, it is assumed that the evaluation information is the difference between the average and the communication quality of each resource unit. In this case, in the case of the same resource unit having the highest communication quality between multiple terminals, this resource unit may be allocated with a high priority to the terminal having the largest difference from the average. It is assumed that the evaluation information is the difference between the highest communication quality and the other communication quality. In this case, in the case of the same resource unit having the highest communication quality between multiple terminals, the minimum values of the differences between the terminals are compared, and this resource unit may be allocated with a high priority to the terminal with the minimum value being the highest.

According to a second example of this Variation, the terminal may transmit the average SNR over the entire band and the SNR of the resource unit having the highest SNR, as the resource unit related information, through the response frame.

The access point can allocate the resource unit using the average SNR and the SNR of the resource unit having the highest SNR. For example, in the case with the same resource unit having the highest SNR between multiple terminals (alternatively, such a condition is not necessarily present), this resource unit is allocated with a high priority to the terminal having the largest difference between the SNR of this resource unit and the average SNR.

[Fifth Variation]

In the sequence examples shown in FIGS. 6 and 15, when the resource unit is allocated to the random access terminal in response to TF-R 501 at the first time, the terminal and the resource unit allocated to this terminal are notified through TF-R 503 transmitted at the second time (see FIG. 11). For example, in TF-R 503, the AID (=1) of the terminal 1 and RU#1 allocated to the terminal 1 are set in the corresponding Per User Info field, and the AID (=2) of the terminal 2 and RU#4 allocated to the terminal 2 are set in the corresponding Per User Info field.

According to another operation example, AID "X" may be set for RU#1 to RU#4 also in TF-R to be transmitted at the second time, through which it may be notified that all the RUs for random access are STA-unspecified RUs, thereby allowing random access to RU#1 to RU#4. Accordingly, the number of candidates of resource units selectable by the terminal in response to TF-Rs at the second time and thereafter is increased. Consequently, the number of frame collisions between terminals at the access point in the case of random access can be reduced. In this case, in the case of receiving TF-R 501 at the first time, the access point may collectively allocate the resource units in the case of receiving TF-R 503 at the second time without allocating the resource units to the terminals 1 and 2. Alternatively, allocation may be made in the case of receiving TF-R 501 at the first time, and reallocation may be made to the terminals 1 and 2 as required in the case of receiving TF-R 503 at the second time.

In a case of resource unit allocation every time receiving the response frame to TF-R through random access, the access point may notify the resource unit allocated to the terminal in the acknowledgement response frame to the frame transmitted through random access (instead of TF-R to be transmitted at the next time or thereafter).

More specifically, in a case where the acknowledgement response frame is the multi-STA BA frame, a field for setting the number (identifier) of the allocated resource unit may be separately provided in the "BA Information" field. In a case where the frame transmitted through random access in response to TF-R is a single frame (in a case where the frame is not an aggregation frame), a method can be considered where in the multi-STA BA frame, the "Block Ack Starting Sequence Control" field and "Block Ack Bitmap" field are not omitted, and the number of the allocated resource unit is set in at least one of these fields.

In a case where the acknowledgement response frame is separately transmitted on a terminal-by-terminal basis (both of cases may be adopted; i.e., the case of transmission in DL-OFDMA, and the case of sequential transmission in a time series manner), the number of the resource unit allocated to the terminal may be set in the frame to be separately transmitted. For example, the BA frame or the ACK frame may be extended so as to add a field for setting such a number. Alternatively, the reserved region of the BA frame may be used, and the number of the resource unit may be set in this region.

[Sixth Variation]

Figure 20:
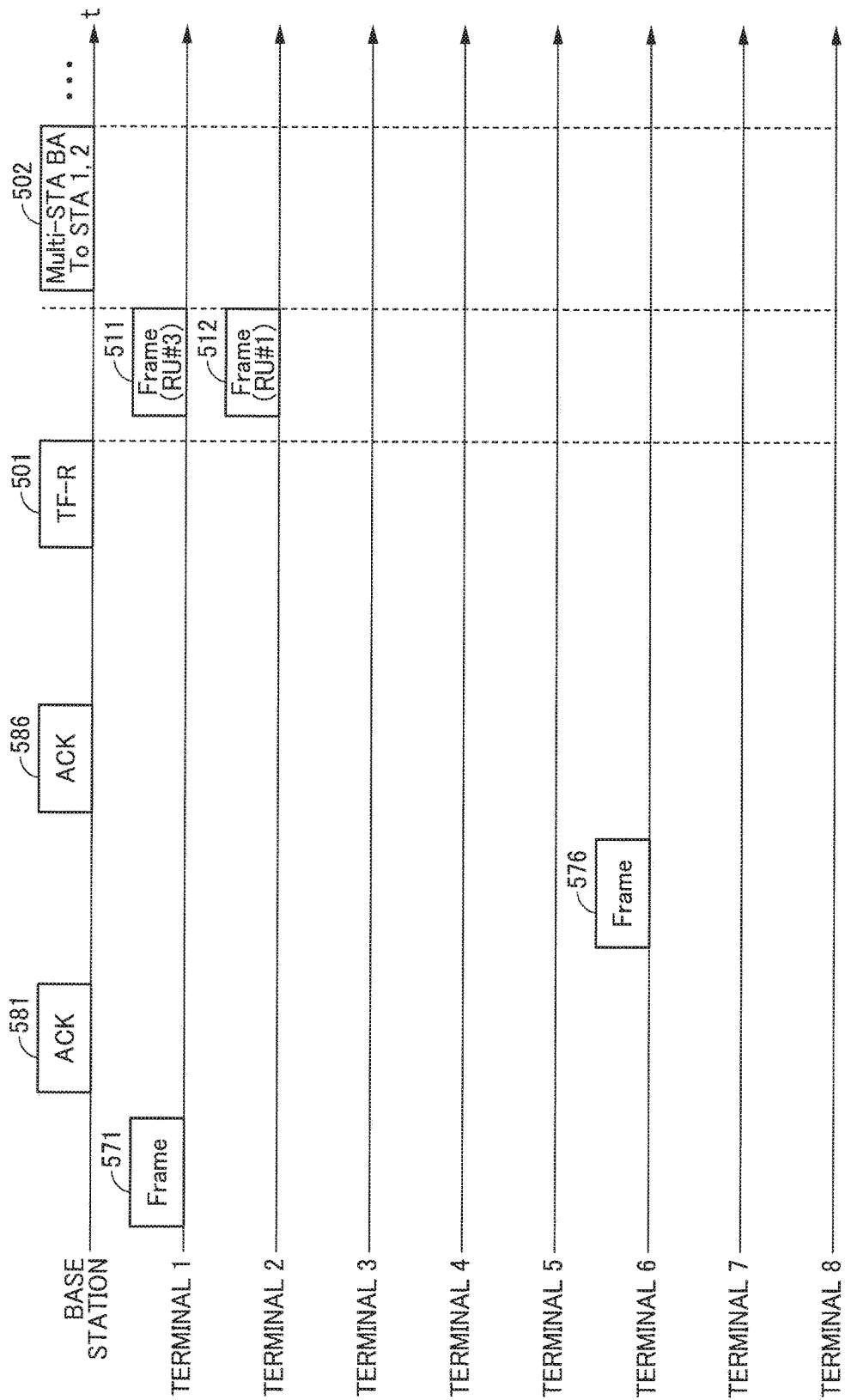
FIG. 20 is a diagram showing an example of an operation sequence according to Variation 6.

In the embodiments and each Variation described above, the resource unit related information is transmitted in the response frame to TF-R. Alternatively, the information may be transmitted before start of the sequence beginning from TF-R. FIG. 20 shows an example of the sequence in this case. The example of the sequence before transmission of TF-R 501 is shown.

The terminals 1 to 8 obtain the access right for the wireless medium on the basis of CSMA/CA, and transmits the resource unit related information to the access point. In the example of the diagram, the terminals 1 and 6 transmit the frames 571 and 576 which contain resource unit related information. After lapse of the SIFS time period, a situation of receiving the ACK frames 581 and 586 from the access point is shown. Note that the access right may be obtained in a case where carrier sensing on the wireless medium during a carrier sensing time period (the total of a fixed time period and the backoff time period) cannot detect a reception signal at least a threshold. Alternatively, the access right may be obtained by transmission and reception of the RTS frame and the CTS frame to and from the access point. Likewise, the terminals other than the terminals 1 and 6 may transmit the resource unit related information before the sequence of FIG. 20. The transmission of TF-R 501 and thereafter are not described because the details are analogous to those in FIG. 6.

The "Type" of each of the frames 571 and 576 may indicate a data frame as with the case of the frames 511 and 512. In this case, the resource unit related information may be set in the HE Control field, or in the body field. The "Type" of each of the frames 571 and 576 is not limited to the data frame. Alternatively, the type may be a control frame or a management frame.

Such transmission of the resource unit related information before transmission of TF-R 501 can reduce the processing load at the access point after TF-R transmission in comparison with the case of transmitting the resource unit related information at the time of TF-R 501 transmission or thereafter. Consequently, there is a possibility of reducing the time period from start of the sequence beginning with TF-R to transmission of a normal trigger frame, that is, the time period to start of UL-OFDMA data transmission by multiple terminals. In this example, the case is exemplified where the resource unit related information is transmitted before TF-R. Alternatively, the uplink transmission request is also transmitted before TF-R at the same time as that of the resource unit related information or is transmitted in another frame. As described in the following Variation 7, there is a case without need of transmission of the uplink transmission request.

[Seventh Variation]

In the embodiments and each Variation described above, the uplink transmission request is included in the response frame to TF-R together with the resource unit related information, or included in the frame to be transmitted in a previous stage. Alternatively, a mode that does not transmit the uplink transmission request is possible. In a case where the object of TF-R is to grasp the terminal having the uplink transmission request, the terminal having responded to TF-R can be assumed to have the uplink transmission request. In this case, transmission of the uplink transmission request may be omitted.

As described in Variation 6, in the case where the access point is assumed to have preliminarily obtained the resource unit related information from each terminal, a mode may be allowed where the response frame does not contain the resource unit related information. In this case, it can be considered that the terminal transmits the frame from which the "HT Control" field is omitted as the response frame to TF-R. It can also be considered that the terminal transmits the frame from which the frame body field is omitted. A null data packet (NDP) used also for QoS sounding can be considered to be used. These cases have an advantage that can reduce the length of the response frame to TF-R. Furthermore, the processing load at the access point after TF-R transmission can be reduced. Consequently, there is a possibility of reducing the time period from start of the sequence beginning with TF-R to transmission of a normal trigger frame.

[Eighth Variation]

An operation example in a case where the access point receives the request for allocating the same resource unit issued by multiple terminals or in a case where the resource units notified to have the highest communication quality are the same is described in detail, although the operation has been described to some extent in the aforementioned embodiments and Variations. The former case of receiving the request for allocating the same resource unit issued by the multiple terminals is herein described. However, the latter case is analogous.

[First example in Variation 8] In the first example, when the multiple terminals request the same resource unit, the access point determines the terminal to which the resource unit is allocated, on the basis of the communication quality of the resource unit at the terminals.

Figure 21:
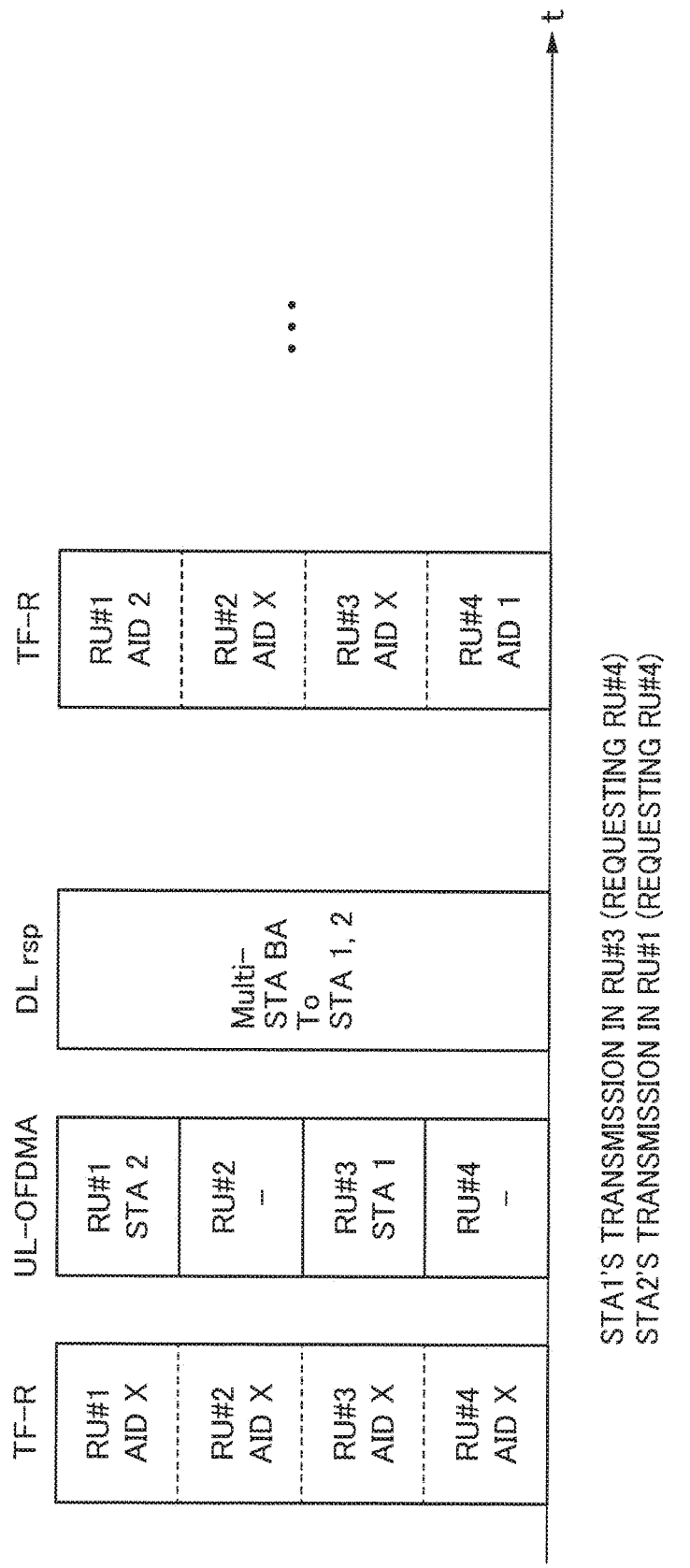
FIG. 21 is a diagram illustrating an operation example according to Variation 8.

FIG. 21 shows a diagram illustrating the first example of the operation according to this Variation. It is assumed that the terminal 1 transmits a response frame that contains a RU#4 allocation request in RU#3 through random access, in response to TF-R transmitted from the access point (the left part in the diagram). It is assumed that the terminal 2 transmits a RU#4 allocation request in RU#1 through random access. It is assumed that in RU#2 and RU#4, no transmission is made from any of other terminals.

In this case, the access point allocates the resource unit (RU#4) specified by the terminal with the resource unit having a lower communication quality in which the response frame having been transmitted, to this terminal. It is herein assumed that the terminal 1 has the communication quality (SNR) of 10 dB and the terminal 2 has SNR of 20 dB (the communication quality for the terminal 2 is higher). In this case, RU#4 is allocated to the terminal 1. The resource unit (RU#1) which is the same as the resource unit in which the response frame has been transmitted is allocated to the terminal 2. It is expected that such allocation improves the communication efficiency in a case of data transmission to multiple terminals in UL-OFDMA based on a normal trigger frame.

In this case, a resource unit other than the resource unit used for random access can be allocated to the terminal 2. For example, a resource unit having the highest communication quality or a communication quality at least a threshold among the resource units other than RU#4 may be allocated to the terminal 2.

[Second example in Variation 8] In the second example, when the multiple terminals request the same resource unit, the access point gives a priority to the terminal having made transmission in this resource unit even through random access. That is, this resource unit is allocated with a priority to the terminal with the resource unit used for random access and the resource unit requested to be allocated being the same as each other.

Figure 22:
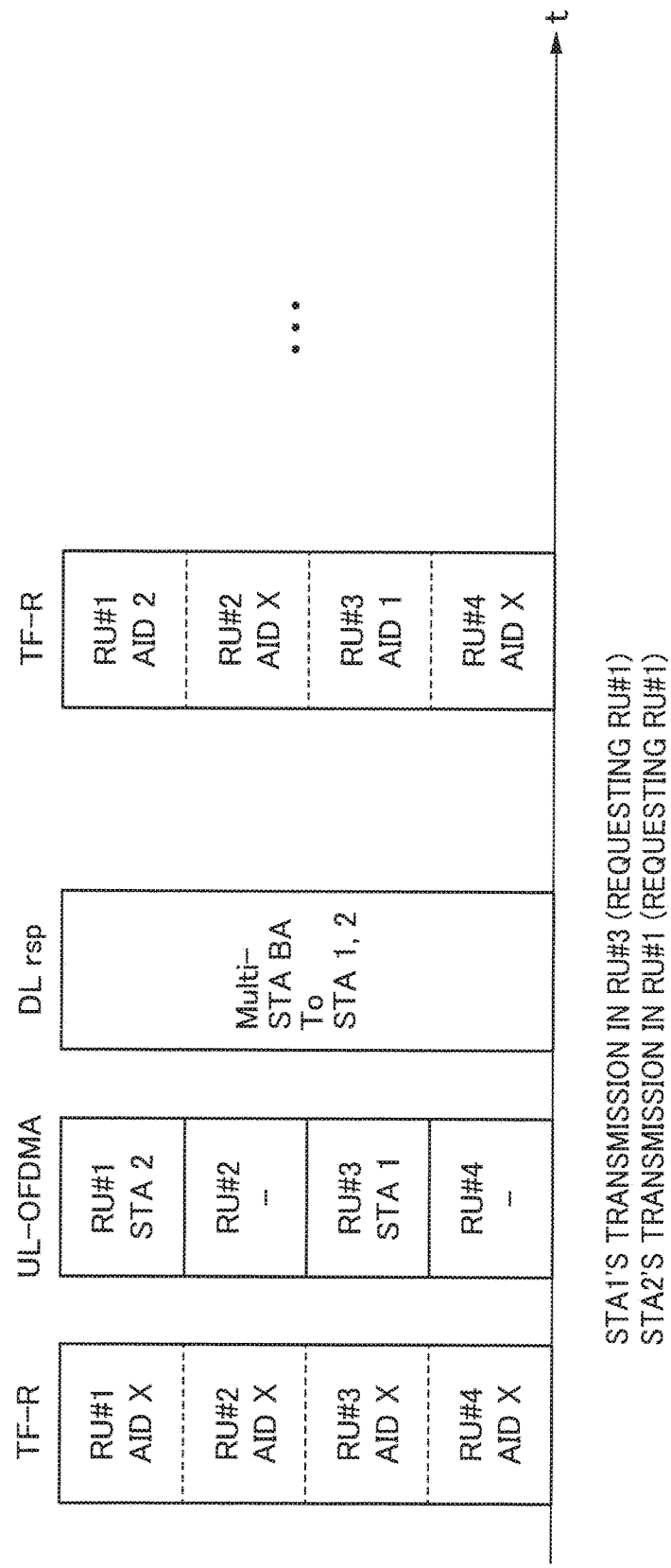
FIG. 22 is a diagram illustrating another operation example according to Variation 8.

FIG. 22 shows a diagram illustrating the second example of the operation according to this Variation. It is assumed that the terminal 1 transmits a response frame that contains a RU#1 allocation request in randomly selected RU#3, in response to TF-R transmitted from the access point (the left part in the diagram). It is assumed that the terminal 2 transmits a response frame that contains a RU#1 allocation request in RU#1 which has been randomly selected (or selected according to the communication quality). It is assumed that in RU#2 and RU#4, no transmission is made from any terminal.

In this case, the access point allocates the resource unit to the terminal having responded in the same resource unit as the resource unit requested for allocation. In this example, RU#1 is allocated to the terminal 2 having transmitted the response frame in RU#1. The resource unit (RU#3) which is the same as the resource unit in which the response frame has been transmitted is allocated to the terminal 1. There is a possibility that the terminal 2 cannot communicate in a resource unit other than RU#1. However, the terminal 1 has been able to receive the response frame in RU#3 (with a communication quality (possible MCS) lower than RU#1). It can thus be determined that communication can be made also in RU#3. Consequently, it can be expected that such allocation allows the terminals 1 and 2 to communicate securely and successfully in UL-OFDMA. In TF-R (the right part of the diagram) at the second time, such an allocation result is notified.

A resource unit other than the resource used for random access can be allocated to the terminal 1. For example, a resource unit having the highest communication quality or a communication quality at least a threshold among the resource units other than RU#1 specified by the terminal 1 in the response frame may be selected and allocated.

[Third example in Variation 8] In the third example, when the multiple terminals request the same resource unit, the access point determines the terminal to which the resource unit is allocated, using information on variation (SNR or the like) in communication qualities of the resource units for the terminals.

For example, the resource unit is allocated to the terminal having the largest variation. Alternatively, the terminal to which the resource unit is allocated is determined from among the terminals having a variation at least a threshold. In a case where the resource units have a large variation, resource units other than the resource unit specified by the terminal have a higher possibility that a preferable communication quality cannot be obtained than the other terminals do. Thus, the resource unit requested by the terminal with a large variation is allocated to this terminal with a high priority, thereby allowing the entire communication efficiency to be improved.

[Fourth example in Variation 8] In the fourth example, when the multiple terminals request the same resource unit, the access point determines the terminal to which the resource unit is allocated, using the average SNR over the entire band (e.g., 20 MHz width) used in UL-OFDMA.

The average SNR over the entire band may be calculated according to the average of resource units contained in the entire band, for example. The average SNR may be obtained in the response frame to TF-R from each terminal, or preliminarily obtained from each terminal according to another method. Alternatively, the SNRs of the respective resource units may be obtained, and the access point may calculate the average thereof. Alternatively, the access point can measure the communication qualities of the resource units on a terminal-by-terminal basis, and use the measured qualities. Instead of the average SNR, another indicator may be adopted only if the indicator is information that represents the average communication quality overt the entire band. The average of RSSIs of resource units included in the entire band may be adopted.

In this fourth example, when the multiple terminals request the same resource unit, the access point allocates this resource unit to the terminal with the lowest average SNR, for example. Alternatively, the terminal to which the resource unit is allocated is determined from among the terminals having an average SNR less than or equal to a threshold. In a case where the resource units have a low average SNR, resource units other than the resource unit requested by the terminal have a higher possibility that a preferable communication quality cannot be obtained than the other terminals do. Thus, the resource unit requested by the terminal with a low average SNR is allocated to this terminal with a high priority, thereby allowing the entire communication efficiency to be improved.

[Ninth Variation]

As described in the aforementioned embodiments and with reference to FIG. 3, there are various patterns of resource units over the entire bandwidth of UL-OFDMA. For example, the case where the entire bandwidth is 20 MHz may encompass a pattern that includes nine resource units each made up of 26 subcarriers, a pattern that includes two resource units each made up of 106 subcarriers and one resource unit made up of 26 subcarriers, a pattern that includes four resource units each made up of 52 subcarriers and one resource unit made up of 26 subcarriers, a pattern that includes only one resource unit made up of 242 subcarriers, and other multiple patterns. It can be considered that increase in bandwidth (the number of subcarriers) of the resource unit sometimes reduces the difference in characteristics between communication qualities according to the selected portion of the resource unit in comparison with the case where the resource unit has a narrow bandwidth. The access point may then determine whether to collect the resource unit related information from each terminal, and notify information whether to collect the information (e.g., one bit) to each terminal. The resource unit related information may be, for example, the request for allocating the resource unit, SNR of each resource unit or the like, which is information contained in the resource unit related information in the above Variations.

The access point obtains the communication quality (here, SNR) of each resource unit from the terminal through the response frame to TF-R or the response frame to the normal trigger frame. Consequently, the terminal measures the communication quality of each resource unit, and includes the communication quality of each resource unit into the response frame (the HE Control field, body field or the like). The access point hereafter determines whether to collect the resource unit related information on the terminal on the basis of the SNR. For example, the variation in SNR between resource units may be calculated. When the variation is less than the threshold, it is determined that the resource unit related information on the terminal is not collected. On the contrary, when the variation is at least the threshold, it is determined to collect the resource unit related information from the terminal. The access point notifies information (bit or the like) representing the determination result to the terminal. More specifically, a field for setting this information may be defined in the acknowledgement response frame to the response frame (the reserved region may be used), and the determination result may be notified through this field. Alternatively, the determination result may be notified through another frame to be transmitted to the terminal at any timing (the frame may be a data frame, a management frame or a control frame). The variation is an example. Alternatively, another indicator may be used. For example, the average of SNRs between resource units may be calculated. In a case where the differences from the average are less than the threshold over all the resource units, it may be determined that collection is unnecessary. In the other cases, it may be determined that collection is necessary.

The terminal having received notification that collection of the resource unit related information is unnecessary does not transmit the information to the access point thereafter. The access point determines that allocation of any resource unit to this terminal causes no problem. On the contrary, the terminal having received notification that collection of the resource unit related information is necessary transmits the resource unit related information to the access point. The access point may allocate the resource unit to the terminal according to the method described in any of the embodiments and Variations.

Thus, the access point collects the resource unit related information only on terminals having a large difference in communication quality characteristics between resource units, thereby allowing the loads on the access point and the terminals to be reduced.

The access point may use the following method besides determination of whether to collect the resource unit related information on each terminal. More specifically, only in a case of determining that collection is unnecessary on a predetermined number or a predetermined ratio of terminals (e.g., all the terminals), determination of unnecessity of collection on all the terminals may be made. In other cases, determination of necessity of collection on all the terminals may be made. Thus, the same process can be applied to all the terminals. Consequently, the operation of the access point can be simplified.

[Tenth Variation]

The above description fundamentally assumes that the terminal responding to TF-R randomly selects the resource unit transmitting the response frame from among the STA-unspecified RUs. Alternatively, a mode of selection according to the communication quality can be adopted. In this Variation, a mode of selective use between the randomly selecting operation and the operation selecting according to the communication quality. In the following description, when the response frame to TF-R is received from the terminal, the access point interprets it as the terminal requesting allocation of the resource unit in which the response frame has been transmitted.

When the variation in communication quality of the resource unit for random access (resource unit with AID "X") is small, the resource unit is randomly selected. The terminal transmits the response frame in the selected resource unit. The access point allocates, to the terminal, the resource unit in which the response frame has been received, for example. According to an example with a small variation in communication quality, the communication quality of these resource units is within the communication quality range to which the same MCS is applicable. Alternatively, the variation in communication quality may be less than the threshold, the difference from the average in communication quality is less than a predetermined value, or another condition may be adopted.

On the contrary, when the variation in communication quality of the resource unit for random access is large, the terminal selects the resource unit having a communication quality (SNR or the like) at least a threshold or the highest communication quality from among these resource units. A specific example of the threshold may be a lower limit value of the communication quality applicable to the same MCS (MCS lower by a predetermined number of steps) as the MCS available in the resource unit with the highest communication quality. A value obtained by adding a margin $\alpha$ to the lower limit value may be adopted as the threshold.

Thus, according to this Variation, the operation of randomly selecting the random access resource unit, and the selecting operation according to the communication quality can be selected. Consequently, during random access, both of possible reduction in probability that the same resource unit is selected by multiple terminals (possibility of occurrence of frame collision at the access point), and efficient resource unit allocation (improvement in efficiency of UL-OFDMA) can be achieved.

[Eleventh Variation]

In the above embodiments and Variations, the resource unit is selected from among the resource units for random access, and the random access is performed in this resource unit (transmission of the response frame). According to another method, in addition to all the resource units used in UL-OFDMA, i.e., the resource units for random access, a resource unit for random access may be selected from among the resource units having already been allocated (resource units other than those with AID of "X" in TF-R). In this case, in the resource unit other than the resource unit for random access, the terminal to which this resource unit has already been allocated operates so as not to respond to TF-R. When the response frame to TF-R is received from the terminal through random access, the access point interprets it as the terminal requesting the resource unit in which the response frame has been transmitted. Upon receipt of the response frame in the resource unit other than the resource unit for random access, the access point reallocates the resource units to terminals to which allocation has already been made in addition to the random access terminal. As to the terminal to which allocation has already been made, the resource unit related information having preliminarily been obtained may be used, or the resource unit related information may be obtained again.

The operation described above increases the implementation load on the access point. However, in a case where allocation of the resource unit to each terminal determined using TF-R is to be used for a long time (in a case with a low TF-R transmission frequency), this operation is effective in view of improving the OFDMA communication efficiency.

The aforementioned embodiments and Variations may be freely combined unless these contradict each other.

The aforementioned embodiments and Variations have been described with reference to the case of uplink multiplexed transmission in UL-OFDMA to the TF-R and normal trigger frame. Alternatively, uplink multiplexed transmission may be used in a communication scheme where UL-OFDMA and uplink MU-MIMO (UL-MU-MIMO) are combined (UL-OFDMA&UL-MU-MIMO).

According to UL-MU-MIMO, multiple terminals transmit frames to the access point at the same timing in the same frequency band (spatial multiplexing transmission), thereby facilitating improvement in efficiency of uplink transmission. Inclusion of preamble signals orthogonal to each other in the physical headers of frames, which are to be transmitted from multiple terminals, allows the access point to estimate the uplink channel response with the terminals on the basis of the preamble signals and to separate these frames. According to UL-OFDMA&MU-MIMO, multiple terminals perform MU-MIMO transmission using the same resource unit with respect to each resource unit. At this time, the multiple terminals using the same resource unit perform transmission using preamble signals different from each other. This embodiment is also applicable to such a scheme, and can be used to allocate the combinations of resource units and preamble signals to the respective terminals.

(Second Embodiment)

Figure 23:
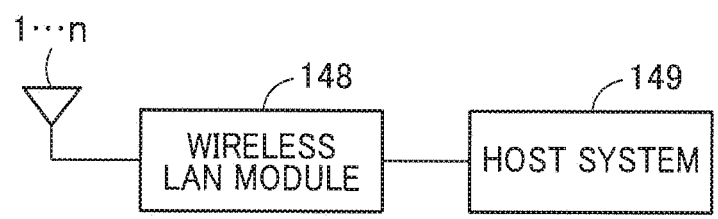
FIG. 23 is a diagram showing an exemplary entire configuration of the terminal or base station.

FIG. 23 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 24:
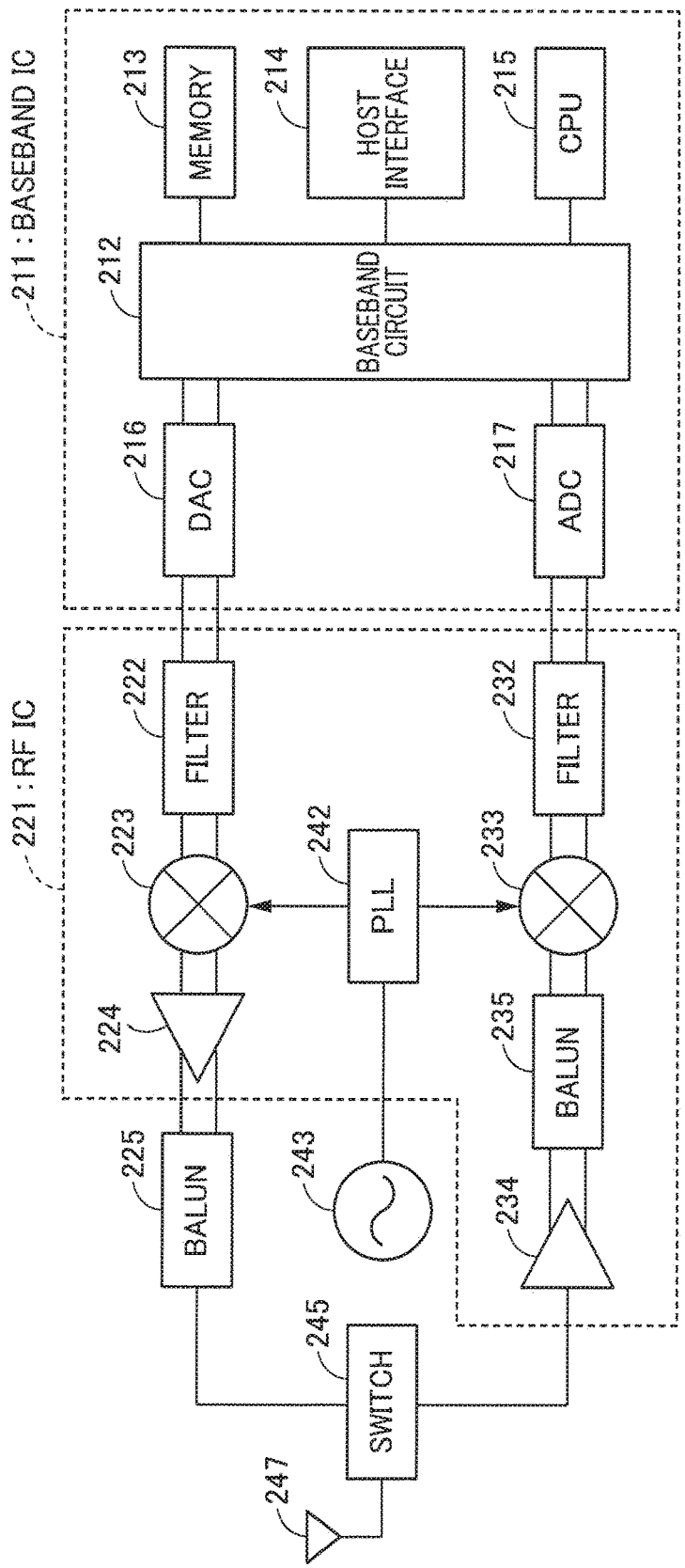
FIG. 24 is a diagram showing an exemplary hardware configuration of the wireless communication device installed at the terminal or the base station according to a third embodiment.

FIG. 24 shows an example of hardware configuration of a wireless LAN module. The configuration can also be applied when the wireless communication device (or a wireless device) is mounted on either one of the terminal that is a non-base station and the base station. Therefore, the configuration can be applied as an example of specific configuration of the wireless communication device shown in FIG. 8 or 10. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detailed description of the process of the above-described components is obvious from the description of the first embodiment, and therefore redundant descriptions will be omitted.

(Third Embodiment)

Figure 25:
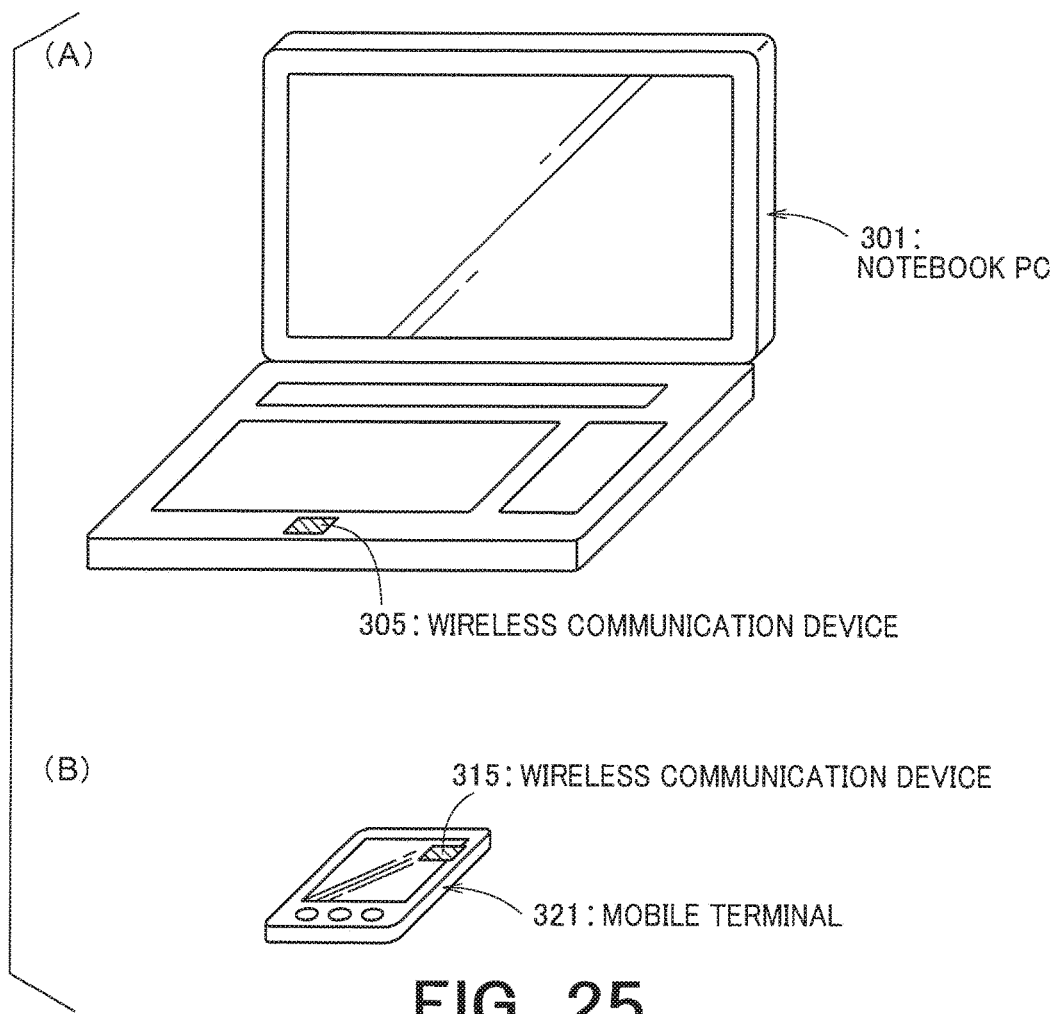
FIG. 25 is a perspective view of the wireless communication terminal according to a fourth embodiment.

FIG. 25(A) and FIG. 25(B) are perspective views of wireless terminal according to the fourth embodiment. The wireless terminal in FIG. 25(A) is a notebook PC 301 and the wireless communication device (or a wireless device) in FIG. 25(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station)

which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 26:
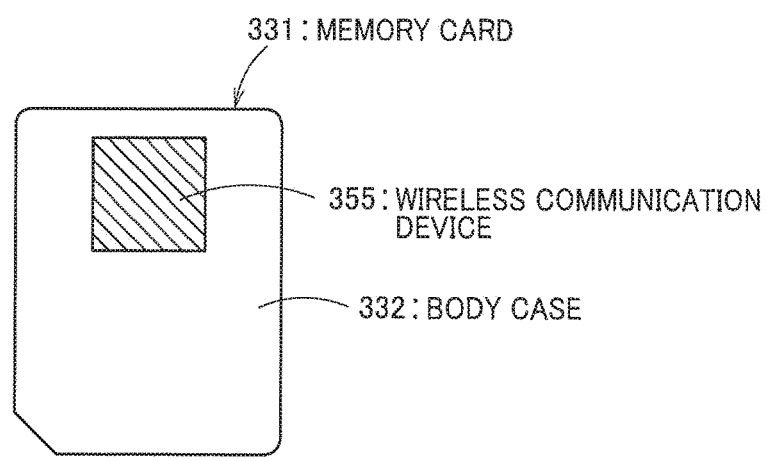
FIG. 26 a diagram showing a memory card according to the fourth embodiment.

Moreover, a wireless communication device installed in a terminal (which may indicate a base station) can also be provided in a memory card. FIG. 26 illustrates an example of a wireless communication device mounted on a memory card. A memory card 331 contains a wireless communication device 355 and a body case 332. The memory card 331 uses the wireless communication device 355 for wireless communication with external devices. Here, in FIG. 26, the description of other installed elements (for example, a memory, and so on) in the memory card 331 is omitted.

(Fourth Embodiment)

In the fourth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Fifth Embodiment)

In the fifth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Sixth Embodiment)

In the sixth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

(Seventh Embodiment)

In the seventh embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

(Eighth Embodiment)

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Ninth Embodiment)

In the ninth embodiment, an LED unit is added to the configuration of the wireless communication device of the terminal (which may indicate the base station) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

(Tenth Embodiment)

In the tenth embodiment, a vibrator unit is included in addition to the configuration of the wireless communication device wireless communication device of the terminal (which may indicate the base station) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

(Eleventh Embodiment)

In the eleventh embodiment, the configuration of the wireless communication device includes a display in addition to the configuration of the wireless communication device (the wireless communication device of the terminal (which may indicate the base station) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

(Twelfth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successively shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are six types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 27:
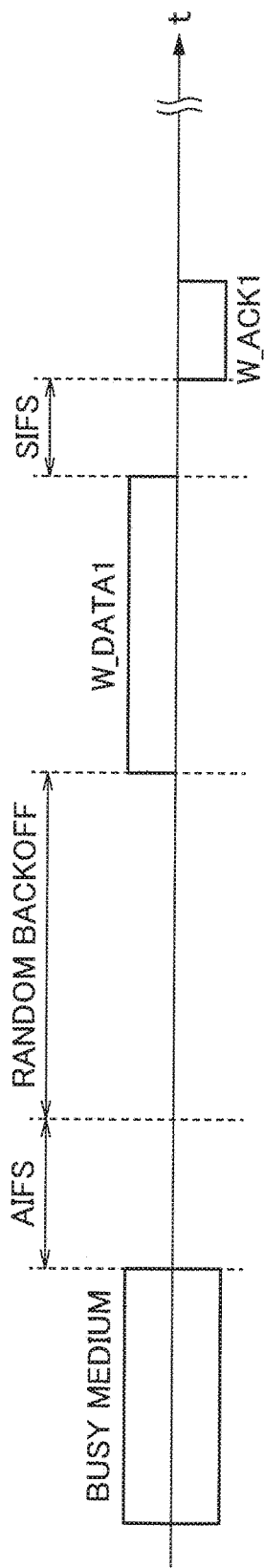
FIG. 27 is a diagram showing an example of frame exchange during a contention period.

Here, FIG. 27 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO (AC_VI) and VOICE (AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The frames multiplexing-transmitted by the plurality of terminals may be the same (for example, the same type or the same content) or may be different. Generally, when it is expressed that the plurality of terminals transmits or receives X-th frames, the X-th frames may be the same or may be different. An arbitrary value can be put into X according to the situation.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device, comprising:
a transmitter configured to transmit a first frame that contains first
information specifying a plurality of frequency components and does not include second information specifying other wireless communication devices to which the plurality of frequency components are allocated;
a receiver configured to simultaneously receive second frames transmitted
by transmitting devices via frequency components randomly selected from among the plurality of frequency components specified in the first information, wherein the transmitting devices transmitting the second frames are ones of the other wireless communication devices and are different from each other; and
controlling circuitry configured to allocate first frequency components
selected from among the plurality of frequency components based on third information to the transmitting devices transmitting the second frames, wherein the first frequency components are different from each other,
wherein the receiver is further configured to receive the third information
through the second frames or third frames transmitted before the second frames are transmitted, and
wherein the third information contains communication quality information
on a second frequency component selected from among the plurality of frequency components, and communication quality information on an entire frequency band to which the plurality of frequency components belong.

2. The wireless communication device according to claim 1,
wherein the third information contains a request for allocating the second
frequency component selected from among the plurality of frequency components, and
the controlling circuitry is configured to allocate the first frequency
component based on the request for allocating.

3. The wireless communication device according to claim 1,
wherein the third information contains a request for allocating the second
frequency component selected from among the plurality of frequency components, and
when the requests for allocating in a same frequency component exist, the
controlling circuitry is configured to allocate the same frequency component to the other wireless communication device from which the second frame has been received via the same frequency component.

4. The wireless communication device according to claim 1,
wherein the first frame contains information specifying a number of the plurality of frequency components specified by the first information.

5. The wireless communication device according to claim 1, further comprising at least one antenna.

6. A wireless communication device, comprising:
a transmitter configured to transmit a first frame that contains first
information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, and wherein the third information contains communication quality information on a second frequency component selected from among the plurality of frequency components, and communication quality information on the frequency component via which the second frame has been transmitted.

7. The wireless communication device according to claim 6, wherein the third information contains communication quality information on an entire frequency band to which the plurality of frequency components belong.

8. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, and wherein the third information contains evaluation information between a communication quality of a second frequency component selected from among the plurality of frequency components and communication qualities of frequency components other than the second frequency component among the plurality of frequency components.

9. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, wherein the third information contains a request for allocating a second frequency component selected from among the plurality of frequency components, wherein the second frequency component is a frequency component having a highest communication quality at the transmitting device among the plurality of frequency components at a transmitting device requesting the second frequency component, and the controlling circuitry is configured to allocate the second frequency component based on the request for allocating.

10. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, and wherein the third information contains difference information between a communication quality of an entire frequency band to which the plurality of frequency components belong and each of communication qualities of the plurality of frequency components.

11. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, wherein the third information contains a request for allocating a second frequency component selected from among the plurality of frequency components, and when the requests for allocating a same frequency component exist, the controlling circuitry is configured to allocate the same frequency component to the other wireless communication device on which communication quality of the same frequency component is lowest or lower than a threshold.

12. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, wherein the controlling circuitry is configured to receive fourth information specifying a transmission data size of the other wireless communication device, through the second frame or the third frame, and allocate the first frequency component based on the fourth information.

13. A wireless communication device, comprising:

a transmitter configured to transmit a first frame that contains first information specifying a plurality of frequency components and does not include second information specifying other wireless communication devices to which the plurality of frequency components are allocated;

a receiver configured to simultaneously receive second frames transmitted by transmitting devices via frequency components randomly selected from among the plurality of frequency components specified in the first information, wherein the transmitting devices transmitting the second frames are ones of the other wireless communication devices and are different from each other; and controlling circuitry configured to allocate first frequency components selected from among the plurality of frequency components based on third information to the transmitting devices transmitting the second frames, wherein the first frequency components are different from each other, wherein the receiver is further configured to receive the third information through the second frames or third frames transmitted before the second frames are transmitted, and wherein the first frame contains information specifying a transmission rate applied for transmission of the second frame.

* * * * *